United States Patent
Solano Arenas et al.

(10) Patent No.: US 11,432,272 B2
(45) Date of Patent: Aug. 30, 2022

(54) ASSIGNMENT OF SHORT PHYSICAL DOWNLINK CONTROL CHANNEL (SPDCCH) CANDIDATES FOR SHORT TRANSMISSION TIME INTERVAL (STTI)

(71) Applicant: Telefonaktiebolaget LM Ericsson (publ), Stockholm (SE)

(72) Inventors: John Camilo Solano Arenas, Dusseldorf (DE); Niklas Andgart, Södra Sandby (SE); Laetitia Falconetti, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 674 days.

(21) Appl. No.: 16/300,445

(22) PCT Filed: Aug. 9, 2018

(86) PCT No.: PCT/EP2018/071683
§ 371 (c)(1),
(2) Date: Nov. 9, 2018

(87) PCT Pub. No.: WO2019/030346
PCT Pub. Date: Feb. 14, 2019

(65) Prior Publication Data
US 2021/0227511 A1 Jul. 22, 2021

Related U.S. Application Data

(60) Provisional application No. 62/544,610, filed on Aug. 11, 2017.

(51) Int. Cl.
*H04W 24/02* (2009.01)
*H04W 24/04* (2009.01)
(Continued)

(52) U.S. Cl.
CPC ....... *H04W 72/042* (2013.01); *H04L 41/0803* (2013.01); *H04L 27/2607* (2013.01); *H04W 72/0446* (2013.01)

(58) Field of Classification Search
None
See application file for complete search history.

(56) References Cited

U.S. PATENT DOCUMENTS

2017/0201977 A1 7/2017 Han et al.
2017/0230154 A1* 8/2017 Tavildar .............. H04W 72/121
(Continued)

FOREIGN PATENT DOCUMENTS

WO 2017018618 A1 2/2017
WO 2018083260 A1 5/2018
(Continued)

OTHER PUBLICATIONS

Nokia Alcatel—Lucent Shanghai Bell: "On design of search space for short PDCCH", 3GPP Draft R1-1612211_ON Design of Search Space for Short PDCCH, 3rd Generation Partnership Project (3GPP), Mobile Competence Centre; 650, Route Des Lucioles; F-06921 Sophia-Antipolis Cedex; Franc, vol. RAN WGL, No. Reno, Nevada, U.S.A; Nov. 14, 2016-Nov. 18, 2016 Nov. 13, 2016 (Nov. 13, 2016)—Consisting of 6 pages.
(Continued)

*Primary Examiner* — Duc T Duong
(74) *Attorney, Agent, or Firm* — Christopher & Weisberg, P.A.

(57) ABSTRACT

A network node, method and wireless device are provided. A network node for configuration of a downlink control channel for a short transmission time interval, sTTI, in a communication network is provided. The network node includes processing circuitry configured to assign a search space region to be monitored by a first wireless device in the
(Continued)

communication network where the search space region includes a plurality of downlink control channel candidates associated with a plurality of aggregation levels. Each of the plurality of downlink control channel candidates have at least one corresponding short Control Channel Element, sCCE. The processing circuitry is further configured to transmit, to the first wireless device, a bitmap indicating at least one of the plurality of downlink control channel candidates for at least one aggregation level to monitor.

18 Claims, 18 Drawing Sheets

(51) Int. Cl.
*H04W 72/04* (2009.01)
*H04L 41/0803* (2022.01)
*H04L 27/26* (2006.01)

(56) References Cited

U.S. PATENT DOCUMENTS

| | | | |
|---|---|---|---|
| 2017/0230994 A1 | 8/2017 | You et al. | |
| 2017/0290004 A1* | 10/2017 | Yang | H04W 72/0446 |
| 2018/0049166 A1* | 2/2018 | Sun | H04W 72/0446 |
| 2018/0049175 A1* | 2/2018 | Bagheri | H04L 41/08 |
| 2018/0124744 A1* | 5/2018 | Xue | H04W 72/042 |
| 2018/0132272 A1* | 5/2018 | Sun | H04L 1/0072 |
| 2018/0167915 A1 | 6/2018 | Lee et al. | |
| 2018/0206266 A1* | 7/2018 | Byun | H04W 72/14 |
| 2018/0227889 A1* | 8/2018 | Yang | H04L 5/0091 |
| 2018/0227939 A1 | 8/2018 | Bagheri et al. | |
| 2018/0242289 A1* | 8/2018 | Andgart | H04W 72/14 |
| 2018/0309489 A1* | 10/2018 | Hosseini | H04L 5/0051 |
| 2018/0324018 A1 | 11/2018 | Hosseini et al. | |
| 2018/0359733 A1* | 12/2018 | Bagheri | H04L 27/2613 |
| 2018/0359742 A1 | 12/2018 | Patel et al. | |
| 2018/0375636 A1 | 12/2018 | You et al. | |
| 2019/0052332 A1* | 2/2019 | Shimezawa | H04B 7/0626 |
| 2019/0053208 A1 | 2/2019 | Zhang et al. | |
| 2019/0098622 A1* | 3/2019 | Lee | H04W 72/042 |
| 2019/0229879 A1* | 7/2019 | Yi | H04W 76/11 |
| 2019/0281623 A1 | 9/2019 | Andgart et al. | |
| 2019/0306737 A1* | 10/2019 | Kwak | H04L 5/0053 |
| 2020/0127783 A1* | 4/2020 | Kwak | H04L 5/0007 |
| 2020/0305129 A1 | 9/2020 | Lee et al. | |
| 2021/0120537 A1* | 4/2021 | Lei | H04L 5/0053 |

FOREIGN PATENT DOCUMENTS

| | | | |
|---|---|---|---|
| WO | 2018141597 A1 | 8/2018 | |
| WO | 2018141931 A1 | 8/2018 | |
| WO | 2018202893 A1 | 11/2018 | |

OTHER PUBLICATIONS

CATT: "Design on sPDCCH multiplexing with data", 3GPP Draft; R1-1707433, Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017 May 14, 2017 (May 14, 2017)—Consisting of 2 pages.

International Search Report and Written Opinion dated Jan. 21, 2019, for corresponding International Application No. PCT/EP2018/071683; International Filing Date: Aug. 9, 2018 consisting of 22-pages.

Huawei et al: Discussion on sPDCCH design:, 3GPP Draft; R1-1704264, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017 Apr. 2, 2017 (Apr. 2, 2017)—Consisting of 16 pages.

International Search Report and Written Opinion dated Oct. 24, 2018, for related International Application No. PCT/EP2018/071745; International Filing Date: Aug. 10, 2018 consisting of 14-pages.

Ericsson: System level evaluation of short TTI; R1-163312; 3GPP TSG RAN WG1 Meeting #84 bis;Busan, Apr. 11-15, 2016; Consisting of 11 pages.

Ericsson: On sTTI scheduling options; 3GPP TSG-RAN WG1 #87 R1-1611511; Reno, USA, Nov. 14-18, 2016; Consisting of 4 pages.

Ericsson: Design aspects of sPDCCH; 3GPP TSG-RAN WG1 Meeting #90 R1-1712895; Prague, Czech Republic, Aug. 21-25, 2017; Consisting of 12 pages.

Ericsson: Search space for sTTI; 3GPP TSG-RAN WG1 Meeting #90 R1-1712896; Prague, Czech Republic, Aug. 21-25, 2017; Consisting of 8 pages.

HTTP Archive-Trends: Desktop Mobile; http://httparchive.org/trends.php; Aug. 9, 2017; Sponsors; Google; Mozilla; New Relic; O'Reiley Media; Etsy; dynaTrace; Instart Logic; Catchpoint Systems; Fastly; SOASTA mPulse and hosting Facts; Consisting of 6 pages.

Ericsson: New Work Item on shortened TTI and processing time for LTE; 3GPP TSG RAN Meeting #72 RP-161299; Busan, Korea, Jun. 13-16, 2016; Consisting of 9 pages.

Ericsson: 3GPP TS 36.213 V14.3.0 (Jun. 2017); 3rd Generation Partnership Project; Technical Specification Group Radio Access Network; Evolved Universal Terrestrial Radio Access (E-UTRA); Physical layer procedures (Release 14); Consisting of 460 pages.

Ericsson: Revised Work Item on shortened TTI and processing time for LTE ; 3GPP TSG RAN Meeting #75 RP-170xxx; Dubrovnik, Croatia, Mar. 6-9, 2017 (revision of RP-162014); Consisting of 5 pages.

Ericsson: 3GPP TS 36.211 V14.3.0 (Jun. 2017); 3rd Generation Partnership Project; Technical Specification Group Radio Access Network; Evolved Universal Terrestrial Radio Access (E-UTRA); Physical channels and modulation (Release 14); Consisting of 195 pages.

Ericsson: Design aspects of sPDCCH—3GPP TSG-RAN WG1 Meeting #88bis R1-1706075; Spokane, US, Apr. 3-7, 2017; Consisting of 8 pages.

Ericsson: Multiplexing sPDCCH with sPDSCH/PDSCH: 3GPP TSG-RAN WG1 Meeting #89 R1-1708864 Hangzhou, P.R. China, May 15-19, 2017; Consisting of 6 pages.

Ericsson: 3GPP TR 36.881 V14.0.0 (Jun. 2016); 3rd Generation Partnership Project; Technical Specification Group Radio Access Network;Evolved Universal Terrestrial Radio Access (E-UTRA); Study on latency reduction techniques for LTE (Release 14); Consisting of 249 pages.

U.S. Office Action dated Jun. 7, 2021 for U.S. Appl. No. 16/306,443, filed Nov. 30, 2018, consisting of 7 pages.

3GPP TSG RAN # 75 RP-170013 MCC TF160 Status Report; Olivier Genoud; Task Force 160 Leader, 3GPP MC; Location and Date Dubrovnik, Croatia, Mar. 2017, consisting of 11 pages.

* cited by examiner

| AL{1, 2, 4} | | Y=0 (UE0)<br>{3, 3, 2, 1} | Y=1 (UE1)<br>{3, 3, 2, 1} |
|---|---|---|---|
| Network Node 12 view | Wireless Device/UE 14 offset<br>Nr of candidates/AL | | |
| | sCCEs within sPDCCH-PRB-set | 0 1 2 3 4 5 6 7 | 0 1 2 3 4 5 6 7 |
| Wireless Device 14 view | Set of AL1 sPDCCH candidates | A B C | A B C |
| | Set of AL2 sPDCCH candidates | D E F | D E F |
| | Set of AL4 sPDCCH candidates | G H | H G |

| AL(1, 2, 4) | | UE offset<br>Nr of candidates/AL | Y=0 (UE0)<br>(3, 2, 1) | Y=1 (UE1)<br>(3, 2, 1) |
|---|---|---|---|---|
| Network Node 12 view | | sCCEs within sPDCCH-PRB-set | 0 1 2 3 4 5 6 7 | 0 1 2 3 4 5 6 7 |
| Wireless Device 14 view | | Set of AL1 sPDCCH candidates | A B C | A B C |
| | | Set of AL2 sPDCCH candidates | D E | D E |
| | | Set of AL4 sPDCCH candidates | F | F |

FIG. 19

ASSIGNMENT OF SHORT PHYSICAL DOWNLINK CONTROL CHANNEL (SPDCCH) CANDIDATES FOR SHORT TRANSMISSION TIME INTERVAL (STTI)

CROSS-REFERENCE TO RELATED APPLICATIONS

This application is a Submission Under 35 U.S.C. § 371 for U.S. National Stage Patent Application of International Application Number: PCT/EP2018/071683, filed Aug. 9, 2018 entitled "ASSIGNMENT OF SHORT PHYSICAL DOWNLINK CONTROL CHANNEL (SPDCCH) CANDIDATES FOR SHORT TRANSMISSION TIME INTERVAL (STTI)," which claims priority to U. S. Provisional Application No.: 62/544610, filed Aug. 11, 2017, entitled "ASSIGNMENT OF SPDCCH CANDIDATES FOR STTI," the entireties of both of which are incorporated herein by reference.

TECHNICAL FIELD

The disclosure relates to wireless communications, and in particular, to assignment of short Physical Downlink Control Channel (sPDCCH) candidates for short Transmission Time Interval (TTI) communications.

BACKGROUND

Latency Reduction with Short TTI Operation

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Shorter latency than previous generations of Third Generation Partnership Project (3GPP, a standardization organization) Radio Access Technologies (RATs) was one performance metric that guided the design of Long Term Evolution (LTE). LTE is also recognized by the end-users to be a system that provides faster access to internet and lower data latencies than previous generations of mobile radio technologies.

Packet data latency is important not only for the perceived responsiveness of the communication system, but packet data latency is also a parameter that indirectly influences the throughput of the system. For example, Hypertext Transfer Protocol (HTTP)/Transmission Control Protocol (TCP) is one common application and transport layer protocol suite used on the internet. The typical size of HTTP based transactions over the internet are in the range of a few 10's of Kbyte up to 1 Mbyte. In this size range, the TCP slow start period is a significant part of the total transport period of the packet stream. During TCP slow start, the performance is latency limited. Hence, improved latency can be showed to improve the average throughput, for this type of TCP based data transactions.

Radio resource efficiency could be positively impacted by latency reductions. Lower packet data latency could increase the number of transmissions possible within a certain delay bound, hence higher Block Error Rate (BLER) targets could be used for the data transmissions, thereby freeing up radio resources to potentially improve the capacity of the communication system.

One area of packet latency reduction relates to the reduction of transport time of data and control signaling, within the context of the length of a transmission time interval (TTI). In Long Term Evolution (LTE) release 8 (Rel-8), a TTI corresponds to one subframe (SF) of length 1 millisecond. One such 1 ms TTI is constructed by using 14 Orthogonal Frequency Division Multiplexing (OFDM) or single-carrier frequency-division multiple access (SC-FDMA) symbols in the case of normal cyclic prefix and 12 OFDM or SC-FDMA symbols in the case of extended cyclic prefix.

Work in 3GPP is ongoing on standardizing "short TTI" or "sTTI" operation, where scheduling and transmission can be performed on a faster timescale. Therefore, the legacy LTE subframe is subdivided into several sTTI. Supported lengths for sTTI of 2, 4 and 7 OFDM symbols are currently discussed. Data transmission in downlink (DL), i.e., from the network node such as a base station to the wireless device, may happen per sTTI via the short Physical Downlink Shared Channel (sPDSCH), which may include a control region short Physical Downlink Control Channel (sPDCCH). In the uplink (UL), i.e., from the wireless device to the network node, data is transmitted per sTTI via a short Physical Uplink Shared Channel (sPUSCH), and control information can be transmitted via a short Physical Uplink Control Channel (sPUCCH).

Scheduling sTTI

Different alternatives are possible to schedule a sTTI in the UL or the DL to a wireless device. In one alternative, individual wireless devices receive information about sPDCCH candidates for short TTI via RRC configuration, configuring wireless devices where to look for the control channel for short TTI, i.e., sPDCCH. The downlink control information (DCI) for sTTI is included directly in the sPDCCH. In another alternative, the DCI for sTTI is split into two parts, a slow DCI is sent in the Physical Downlink Control Channel (PDCCH) and a fast DCI is sent in the sPDCCH. The slow grant can contain the frequency allocation for a DL and an UL short TTI band to be used for short TTI operation. The slow grant can also contain refinement about sPDCCH candidate locations.

Control Signaling in LTE

3GPP LTE technology is a mobile broadband wireless communication technology in which transmissions from base stations (also referred to as network nodes) to mobile stations (also referred to as wireless devices) are sent using orthogonal frequency division multiplexing (OFDM). OFDM splits the signal into multiple parallel sub-carriers in the frequency domain. The basic unit of transmission in LTE is a resource block (RB) which in its most common configuration consists of 12 subcarriers and 7 OFDM symbols (one slot) in the case of normal cyclic prefix. In the case of extended cyclic prefix, a RB consists of 6 OFDM symbols in the time domain. A common term is also a physical resource block (PRB) to indicate the RB in the physical resource. Two PRBs in the same subframe that use the same 12 subcarriers are denoted a PRB pair. This is the minimum resource unit that can be scheduled in LTE.

A unit of one subcarrier and 1 OFDM symbol is referred to as a resource element (RE) as illustrated in FIG. 1. Thus, a PRB consists of 84 REs. An LTE radio subframe is composed of multiple resource blocks in frequency with the number of PRBs determining the bandwidth of the system and two slots in time as illustrated in FIG. 2.

In the time domain, LTE downlink transmissions are organized into radio frames of 10 ms, each radio frame consisting of ten equally-sized subframes of length $T_{subframe}$=1 ms.

Messages transmitted over the radio link to wireless devices can be broadly classified as control messages or data messages. Control messages are used to facilitate the proper operation of the system as well as proper operation of each wireless device within the system. Control messages can include commands to control functions such as the transmitted power from a wireless device, signaling of RBs within which the data is to be received by the wireless device or transmitted from the wireless device and so on.

In Rel-8, the first one to four OFDM symbols, depending on the configuration, in a subframe are reserved to contain such control information, as illustrated in FIG. 2. Furthermore, in 3GPP release 11 (Rel-11), an enhanced control channel (EPDCCH) was introduced, in which PRB pairs are reserved to exclusively contain EPDCCH transmissions, although excluding from the PRB pair the one to four first symbols that may contain control information to wireless devices of releases earlier than Rel-11, as illustrated in FIG. 3, where a downlink subframe is illustrated having 10 RB pairs and configuration of three EPDCCH regions (Regions 1-3) of size 1 PRB pair each. The remaining PRB pairs can be used for PDSCH transmissions.

Hence, the EPDCCH is frequency multiplexed with PDSCH transmissions, contrary to PDCCH which is time multiplexed with PDSCH transmissions. The resource allocation (RA) for PDSCH transmissions exists in several RA types, depending on the downlink control information (DCI) format. Some RA types have a minimum scheduling granularity of a resource block group (RBG). An RBG is a set of adjacent (in frequency) resource blocks and when scheduling the wireless device, the wireless device is allocated resources in terms of RBGs and not individual RBs.

When a wireless device is scheduled in the downlink from an EPDCCH, the wireless device assumes that the PRB pairs carrying the DL assignment are excluded from the resource allocation, i.e., rate matching applies. For example, if a wireless device is scheduled PDSCH in a certain RBG of size 3 adjacent PRB pairs, and one of these PRB pairs contain the DL assignment, the wireless device may assume that the PDSCH is only transmitted in the two remaining PRB pairs in this RBG. Note also that multiplexing of PDSCH and any EPDCCH transmission within a PRB pair is not supported in Rel-11.

The PDCCHs and EPDCCHs are transmitted over radio resources that are shared between several wireless devices. Each PDCCH consists of smaller parts, known as control channel elements (CCE), to enable link adaptation (by controlling the number of CCEs a PDCCH is utilizing). For PDCCH, a wireless device monitors 4 aggregation levels of CCEs, namely, 1, 2, 4, and 8, for wireless device-specific search space and 2 aggregation levels of CCEs, namely, 4 and 8, for common search space.

In 3GPP Technical Specification (TS) 36.213, Section 9.1.1, a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by $$L\{(Y_k+m')\text{mod}[N_{CCE,k}/L]\}+i$$

where i=0, ..., L−1. For the common search space m'=m. For the PDCCH wireless device specific search space, if the wireless device is configured with carrier indicator field then $m'=m+M^{(L)}*n_{CI}$, where $n_{CI}$ is the carrier indicator field value, otherwise m'=m, when m=0, ..., $M^{(L)}$−1. $M^{(L)}$ is the number of PDCCH candidates to monitor in the given search space. Each CCE contains 36 QPSK modulation symbols.

The value of $M^{(L)}$ is specified by Table 9.1.1-1 in 3GPP TS 36.213, as shown below in Table 1. For the common search spaces, $Y_k$ is set to 0 for L={4, 8}. For the wireless device-specific search space $S_k^{(L)}$ at aggregation level L, $Y_k$ is defined by $Y_k=(A*Y_{k-1})\text{mod}$ D. $Y_{K-1}=n_{RNTI} \neq 0$, A=39827, D=65537 and $k=\lfloor n_s/2 \rfloor$, $n_s$ is the slot number within a radio subframe. The RNTI value used for $n_{RNTI}$ is defined in subclauses 7 and 8 in TS 36.213.

TABLE 1

$M^{(L)}$ vs. Aggregation Level L for PDCCH

| | Search space $S_k^{(L)}$ | | Number of PDCCH candidates |
|---|---|---|---|
| Type | Aggregation level L | Size [in CCEs] | $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

PDCCH Processing

After channel coding, scrambling, modulation and interleaving of the control information, the modulated symbols are mapped to the resource elements in the control region. To multiplex multiple PDCCH onto the control region, control channel elements (CCE) has been defined, where each CCE maps to 36 resource elements. One PDCCH can, depending on the information payload size and the required level of channel coding protection, consist of 1, 2, 4 or 8 CCEs, and the number is denoted as the CCE aggregation level (AL). By choosing the aggregation level, link-adaptation of the PDCCH is obtained. In total, there are $N_{CCE}$ CCEs available for all the PDCCH to be transmitted in the subframe, and the number $N_{CCE}$ varies from subframe to subframe depending on the number of control symbols n and the number of antenna ports configured.

As $N_{CCE}$ varies from subframe to subframe, the wireless device needs to blindly determine the position and the number of CCEs used for its PDCCH which can be a computationally intensive decoding task. Therefore, some restrictions in the number of possible blind decoding a wireless device needs to go through have been introduced. For instance, the CCEs are numbered, and CCE aggregation levels of size K can only start on CCE numbers evenly divisible by K, as illustrated in FIG. 4.

The set of candidate control channels formed by CCEs where a wireless device needs to blindly decode and search for a valid PDCCH are called search spaces. This is the set of CCEs of an aggregation level (AL) that a terminal should monitor for scheduling assignments or other control information, as illustrated in the example of FIG. 5. In FIG. 5, the search space that a certain wireless device is to monitor is indicated by the darker hatching while the common search space of $N_{CCE}$=15 CCEs is indicated by the lighter hatching. In each subframe and on each AL, a wireless device will attempt to decode all the PDCCHs that can be formed from the CCEs in its search space. If the CRC checks, then the content of the PDCCH is assumed to be valid for the terminal and it further processes the received information. Often two or more terminals have overlapping search spaces and the network has to select one of them for scheduling of the control channel. When this happens, the non-scheduled wireless device is "blocked". The search spaces vary pseudo-randomly from subframe to subframe to minimize this blocking probability.

A search space is further divided to a common and a wireless device specific part. In the common search space, the PDCCH containing information to all or a group of wireless devices is transmitted (paging, system information, etc.). If carrier aggregation is used, a wireless device will find the common search space present on the primary component carrier (PCC) only. The common search space is restricted to aggregation levels 4 and 8 to give sufficient channel code protection for all terminals in the cell (since it is a broadcast channel, link adaptation cannot be used). The m8 and m4 first PDCCH (with lowest CCE number) in an AL of 8 or 4 respectively belong to the common search space. For efficient use of the CCEs in the system, the remaining search space is wireless device specific at each aggregation level.

A CCE consists of 36 Quadrature Phase Shift Keying (QPSK) modulated symbols that map to the 36 REs unique for this CCE. To maximize the diversity and interference randomization, interleaving of all the CCEs is used before a cell specific cyclic shift and mapping to REs, the steps of this process are in illustrated in the flow diagram of FIG. 6. For example, a network node structures all PDCCH into CCE (Block S100). The network node scrambles and modulates (Block S102). The network node optionally performs layer mapping and transmit diversity (Block S104). The network node performs quadruplex based interleaving (Block S106). The network node performs a cyclic shift based on the Cell ID (Block S108). The network node performs mapping to the resource element group (REG) (Block S110).

Note that in most cases some CCEs are empty due to the PDCCH location restriction to wireless device search spaces and aggregation levels. The empty CCEs are included in the interleaving process and mapping to RE as any other PDCCH to maintain the search space structure. Empty CCE are set to zero power and this power can instead be used by non-empty CCEs to further enhance the PDCCH transmission.

Furthermore, to enable the use of 4 antenna TX diversity, a group of 4 adjacent QPSK symbols in a CCE is mapped to 4 adjacent RE, denoted a RE group (REG). Hence, the CCE interleaving is quadruplex (group of 4) based and mapping process has a granularity of 1 REG and one CCE corresponds to 9 REGs (=36 RE).

There will also be a general collection of REG that remains after the set of size $N_{CCE}$ CCEs has been determined (although the remaining REGs are fewer than 36 RE) since the number of REGs available for PDCCH in the system bandwidth is in general not an even multiple of 9 REGs. These remaining REGs are in LTE unused by the communication system.

EPDCCH Details

Similar as for PDCCH, the EPDCCH is transmitted over radio resources shared by multiple wireless devices and enhanced CCE (eCCE) is introduced as the equivalent to CCE for PDCCH. An eCCE has also a fixed number of RE but the number of RE available for EPDCCH mapping is generally fewer than this fixed number because many RE are occupied by other signals such as CRS and CSI-RS. Code chain rate matching is applied whenever a RE belonging to a eCCE contains other colliding signals such as the CRS, CSI-RS, legacy control region or in case of Time Division Duplex (TDD), the Guard Period (GP) and Uplink Pilot Time Slot (UpPTS) 3GPP TS 36.211.

Consider the example in FIGS. 7a and 7b that illustrate the difference between CCE (a) and eCCE (b), where (a) illustrates the PDCCH mapping, which avoids the CRS so that a CCE consist of $T_{avail}$=36 available RE. In (b), there is shown how the eCCE consists of 36 REs nominally, but the number of available REs is less in case there are colliding signals, hence $T_{avail}$≤36 RE for EPDCCH. Since the colliding signals is subframe dependent, the value of $T_{avail}$ becomes subframe dependent as well and could even be different for different eCCEs if the collisions impact on the eCCEs unevenly.

When the number of eCCE per PRB pair is 2 the nominal number of RE per eCCE is not 36 but instead 72 or 64 for normal and extended CP length respectively.

In 3GPP Rel-11, the EPDCCH supports wireless device specific search space whereas the common search space remains to be monitored in the PDCCH in the same subframe. In future 3GPP TS releases, the common search space may be introduced also for EPDCCH transmission. It is specified that the wireless device monitors eCCE aggregation levels 1, 2, 4, 8, 16 and 32 with restrictions shown.

In distributed transmissions, an EPDCCH is mapped to resource elements in up to D PRB pairs, where D=2, 4 or 8 (the value of D=16 is also being considered in 3GPP). In this manner, frequency diversity be achieved for the EPDCCH message. FIG. 8 illustrates a schematic example in which downlink subframe showing 4 parts belonging to an EPDCCH is mapped to multiple of the enhanced control regions known as PRB pairs, to achieve distributed transmission and frequency diversity or subband precoding.

In localized transmission, an EPDCCH is mapped to one PRB pair only, if the space allows (which is always possible for aggregation level one and two and for normal subframes and normal CP length also for level four). In case the aggregation level of the EPDCCH is too large, a second PRB pair is used as well, and so on, using more PRB pairs, until all eCCEs belonging to the EPDCCH has been mapped. FIG. 9 is an illustration of localized transmission in which the downlink subframe showing the 4 eCCEs belonging to an EPDCCH is mapped to one of the enhanced control regions, to achieve localized transmission.

As an example, in normal subframe and with normal CP length and with $n_{EPDCCH}$≥104, localized transmission is using aggregation levels (1,2,4,8) and they are mapped to (1,1,1,2) PRB pairs respectively.

To facilitate the mapping of eCCEs to physical resources each PRB pair is divided into 16 enhanced resource element groups (eREGs) and each eCCE is split into 4 or 8 eREGs for normal and extended cyclic prefix, respectively. An EPDCCH is consequently mapped to a multiple of four or eight eREGs depending on the aggregation level.

These eREG belonging to an ePDCCH resides in either a single PRB pair (as is typical for localized transmission) or a multiple of PRB pairs (as is typical for distributed transmission).

The exact division of a PRB pair into eREG.

Assignment of EPDCCH candidates

A wireless device is configured by higher layers with one or two EPDCCH-PRB-sets for EPDCCH monitoring, as described in 3GPP TS 36.213. Each EPDCCH-PRB-set consists of a set of ECCEs numbered from 0 to $N_{ECCE,p,k}$−1, where $N_{ECCE,p,k}$ is the number of ECCEs in EPDCCH-PRB-set p of subframe k.

The wireless device monitors a set of EPDCCH candidates, that is, attempting to decode each of the possible EPDCCHs, at different aggregation levels, within the set.

The set of EPDCCH candidates to monitor are defined in terms of EPDCCH wireless device-specific search spaces.

The ECCEs corresponding to an EPDCCH candidate m of the wireless device-specific search space are given by the following formulation:

$$L\left\{\left(Y_{p,k} + \left\lfloor \frac{m \cdot N_{ECCE,p,k}}{L \cdot M_p^{(L)}} \right\rfloor + b\right) mod \lfloor N_{ECCE,p,k}/L \rfloor\right\} + i$$

where $Y_{p,k}$ refers to wireless device Radio Network Temporary Identifier (RNTI) based offset, L is aggregation level, $i=0, \ldots, L-1$, b is equal to the carrier indicator field value (if the wireless device is configured with it, otherwise b=0), $m=0,1, \ldots, M_p^{(L)}-1$, and $M_p^{(L)}$ is the number of EPDCCH candidates to monitor at aggregation level L in EPDCCH-PRB-set p.

sPDCCH for sTTI

In order to quickly schedule low latency data on the short TTIs, a new short PDCCH (sPDCCH) needs to be defined. Since the short TTI operation is desired to co-exist with legacy TTI operation, the sPDCCH should be placed in-band within PDSCH, still leaving resources for legacy data.

Legacy control channels PDCCH and EPDCCH use Cell Specific Reference Signal (CRS) and Demodulation Reference Signal (DMRS) demodulation, respectively. For operation in both these environments, an sPDCCH should support both CRS and DMRS, and to maintain efficiently, resources not used by sPDCCH should be used by sPDSCH (short PDSCH).

To facilitate the definition of the sPDCCH mapping to resource elements special entities are defined: sREG and sCCE. This follows the methodology used so far in the LTE specifications, i.e., 3GPP TSs, for defining PDCCH and ePDCCH, as described above. The definition of the same mapping can also be done without using these terms or by using equivalent terms.

sREG configuration

The candidate lengths for sPDCCH in time domain are 1 or 2 Orthogonal frequency-division multiplexing (OFDM) symbols for sTTI operation. The REs of a PRB in a given OFDM symbol of the sTTI can build one or more sREG. The number of REs in a sREG may also be variable in order to provide allocation flexibility and to support good frequency diversity.

The sREG configuration for sPDCCH is defined as the complete number of REs in a PRB within 1 OFDM symbol (i.e., 12 REs per sREG in 1 OFDM symbol). These sREG configurations are depicted in FIG. 10 where sREG configuration is based on 12 REs within 1 OFDM for 1 OFDM symbol sPDCCH (left), 2 OFDM symbol sPDCCH (center) and 2 OFDM symbol sPDCCH (right), considering 1 OFDM symbol sPDCCH, 2 OFDM symbol sPDCCH and 3 OFDM symbol sPDCCH. Each index, i.e. {0, 1, 2}, represents an sREG group.

sCCE Configuration

The number of sREG required to build up a sCCE for a given sPDCCH can vary as well as their placement scheme along the frequency resources used for sTTI operation. One option is to define a sCCE to be composed ideally by 36 REs like an eCCE or a CCE. For that, and based on FIG. 10, an sCCE is composed by three sREG, i.e. 1 sCCE=3 sREG.

For DMRS-based sPDCCH, a further option to consider in order to increase the number of REs available within 2 OFDM symbols SPDCCH is that an sCCE is defined to be composed by 48 REs instead of 36 REs, i.e. 1 sCCE=4 sREG. The 12 additional REs help compensating the DMRS overhead compared to CRS based sPDCCH.

In order to support good frequency diversity, or a more localized placement, localized and distributed placement schemes of sREG building up the same sCCE are defined:

Localized scheme: sREGs building the same sCCE can be localized in frequency domain to allow for a sPDCCH resource allocation confined in a limited frequency band. This facilitates the use of beamforming for DMRS based sPDCCH.

Distributed scheme: A distributed sREG location can be used to allow frequency diversity gains. In this case, multiple UEs may have the sREG of their sPDCCH mapped to the same PRB on different REs. Distributing over a wide frequency range also more easily makes the sPDCCH fit into one single OFDM symbol. For wireless devices with DMRS based demodulation, wireless device-specific beamforming is not recommended with distributed sCCE locations.

These schemes, which are described below for building sCCE based on 1 OFDM symbol sPDCCH, 2 OFDM symbol sPDCCH and 3 OFDM symbol sPDCCH, can be used for CRS and DMRS transmissions.

Likewise, this takes into account the following considerations:

CRS and DMRS wireless devices can coexist on the same sTTI, since sPDCCH design is the same.

If both CRS and DMRS users are given DCI in the same PRB, CRS wireless devices need to be indicated with this. Then the wireless devices know that some REs are not used for sCCE. Otherwise, CRS and DMRS users have to be sent DCI in different PRBs.

Configuration of PRBs that can be Used for sPDCCH

At least one set of PRBs that can be used for sPDCCH is configured per wireless device. It has been recommended to support the configuration of several sets of PRBs used for sPDCCH in order to configure one set of PRBs following the localized sPDCCH mapping and another set with the distributed mapping. The wireless device would monitor both sets and the network node could select the most favorable configuration/PRB set for a given sTTI and wireless device.

The set of PRBs assigned for the sPDCCH, which includes PRBs (not necessarily consecutive) from the available sTTI band, may be configured via RRC signaling. However, the set may include a potential resource allocation refinement in the slow DCI transmitted in PDCCH, e.g., a reduced set of PRBs or a specific set in case that several sPDCCH sets were defined.

The set of PRBs may be configured independently, e.g., as a PRB bitmap. The set can also be configured based on groups of PRBs. One example of already defined group of PRBs in LTE is called RBG and can be used as basis in the proposed sPDCCH mapping. Then all PRBs within the same PRB group, e.g. RBG, are jointly used.

The PRBs or groups of PRBs included in the configured PRB set may be ordered according to a sequence signaled to the wireless device before mapping the sPDCCH to them.

sPDCCH Configuration

1 OFDM symbol sPDCCH is defined for CRS based transmissions due to the advantage of early decoding for 2 OFDM symbol sTTI and slot TTI. 2 OFDM symbol sPDCCH can also be configured for both 2 OFDM symbol sTTI and slot TTI as an alternative to allow a small sTTI band, i.e., to limit the number of frequency resources used for sTTI operation.

For DMRS based transmissions with 2 OFDM symbol sTTI, assuming a design based on DMRS pairs in time domain as in legacy LTE, a 2 OFDM symbol sPDCCH is defined, since wireless devices need anyway to wait for the end of sTTI for channel estimation. In that case, DMRS is thus not shared between sPDCCH and sPDSCH in a given PRB of the sTTI. This gives more freedom for applying beamforming for sPDCCH. Furthermore, for some sTTI in a subframe, the TTI length is 3 symbols instead of 2 symbols. To allow beamforming flexibility, a 3 symbol sPDCCH can be considered for the 3-symbol long sTTI.

For DMRS with 1-slot sTTI, a 2 symbols sPDCCH is suitable. One DMRS pair for 1-slot TTI is preferred to be able to do channel estimation for sPDCCH and early sPDCCH decoding. Likewise, 3 OFDM symbol sPDCCH is also suitable for 1-slot TTI for those cases with only few REs available within the first 2 symbols in the slot due to reference signals and other kind of overhead.

Thereby, considering the presence of potential reference signals in a sTTI such as DMRS, CRS or CSI-RS, those REs occupied by these signals within a PRB are not used for a given sREG.

Consider the example where sPDCCH spans only the first OFDM symbol of a 2 symbol sTTI and that an sCCE is composed of 36 REs like an ECCE or a CCE. In this case, 3 PRBs are needed to build a sCCE (i.e., 3 sREG). These 3 PRBs can be distributed over the sPDCCH-PRB-set or can be localized as three consecutive PRBs. In FIG. 11, an example of distributed and localized configurations are depicted for 4 sCCEs composed of 3 sREGs each with a los-sPDCCH-PRB-set, and 1 OFDM symbol sPDCCH (the unused PRBs shown in FIG. 9 can be further assigned for building other sCCE as well as the possibility to be used for sPDSCH allocation).

SUMMARY

There may be a need to define sPDCCH transmission characteristics and to decode sPDCCH, respectively, in an efficient, easy and flexible manner.

Some embodiments advantageously provide a method and system for assignment of short Physical Downlink Control Channel (sPDCCH) candidates for short Transmission Time Interval (sTTI).

In one embodiment, a method, i.e., first method, for the assignment of sPDCCH candidates of the wireless device-specific search space for sTTI operation is provided. Furthermore, a method to reduce the number of blind decodes to be performed by a wireless device is provided.

In one or more embodiments, a method, i.e., a second method, is provided for assigning sPDCCH candidates at different aggregation levels for a wireless device within a configured search space region. This method can be based on the specified definition for EPDCCH or the one for PDCCH. This method also allows sharing the same search space region among different wireless devices. Furthermore, the second method is defined in order to limit the total number of blind decodes to be performed by the wireless devices per each sTTI. Based on the second method, a wireless device can skip determining again the sPDCCH candidates found by the first method. This leads to facilitate wireless device's implementation and capabilities. Besides, the proposed methods provide full flexibility to the network node for the transmission of sPDCCH. This is achieved by leaving the freedom to the network node to make the wireless device search space of different wireless devices overlap or not overlap.

According to one aspect of the disclosure, a network node for configuration of a downlink control channel for a short transmission time interval, sTTI, in a communication network is provided. The network node includes processing circuitry configured to assign a search space region to be monitored by a first wireless device in the communication network where the search space region includes a plurality of downlink control channel candidates associated with a plurality of aggregation levels. Each of the plurality of downlink control channel candidates have at least one corresponding short Control Channel Element, sCCE. The processing circuitry is further configured to transmit, to the first wireless device, a bitmap indicating at least one of the plurality of downlink control channel candidates for at least one aggregation level to monitor.

According to one embodiment of this aspect, the bitmap includes a plurality of groups of bits where each group of bits corresponding to a respective one of the plurality of aggregation levels. According to one embodiment of this aspect, each group of bits indicates sCCEs for an aggregation level to monitor. According to one embodiment of this aspect, the plurality of aggregation levels include at least aggregation levels 1, 2 and 4. According to one or more embodiments, the bitmap includes a plurality of bits where each bit corresponds to a respective one of the plurality of aggregation levels.

According to one embodiment of this aspect, the bitmap indicates to monitor a subset of configured sCCEs for at least one of the plurality of aggregation levels. According to one embodiment of this aspect, the bitmap is transmitted via Radio Resource Control, RRC, signaling. According to one embodiment of this aspect, each downlink control channel candidate is a short Physical Downlink Control Channel, sPDCCH, candidate. According to one embodiment of this aspect, the bitmap corresponds to a set of physical resource block, PRB, pairs to which the search space is mapped where the set of PRB pairs enables localized or distributed mapping of the search space to the set of PRB pairs.

According to one embodiment of this aspect, the plurality of sCCE are consecutive sCCEs. According to one embodiment of this aspect, the processing circuitry is further configured to assign another search space region to be monitored by a second wireless device in the communication network, and transmit, to the second wireless device, another bitmap indicating at least one of the plurality of downlink control channel candidates for at least one aggregation level to monitor. According to one embodiment of this aspect, the at least one of the downlink control channel candidates for the second wireless device to monitor partially overlaps with the at least one of the downlink control channel candidates for the first wireless device to monitor. According to one or more embodiments, the bitmap is a bitmap field.

According to another aspect of the disclosure, a method for a network node for configuration of a downlink control channel for a short transmission time interval, sTTI, in a communication network is provided. A search space region to be monitored by a first wireless device in the communication network is assigned. The search space region includes a plurality of downlink control channel candidates associated with a plurality of aggregation levels where each of the plurality of downlink control channel candidates having at least one corresponding short Control Channel Element, sCCE. A bitmap indicating at least one of the plurality of downlink control channel candidates for at least one aggregation level to monitor is transmitted to the first wireless device.

According to one embodiment of this aspect, the bitmap includes a plurality of groups of bits, each group of bits corresponding to a respective one of the plurality of aggregation levels. According to one embodiment of this aspect, each group of bits indicates sCCEs for an aggregation level to monitor. According to one embodiment of this aspect, the plurality of aggregation levels include at least aggregation levels 1, 2 and 4. According to one or more embodiments, the bitmap includes a plurality of bits where each bit corresponds to a respective one of the plurality of aggregation levels.

According to one embodiment of this aspect, the bitmap indicates to monitor a subset of configured sCCEs for at least one of the plurality of aggregation levels. According to one embodiment of this aspect, the bitmap is transmitted via Radio Resource Control, RRC, signaling. According to one embodiment of this aspect, each downlink control channel candidate is a short Physical Downlink Control Channel, sPDCCH, candidate. According to one embodiment of this aspect, the bitmap corresponds to a set of physical resource block, PRB, pairs to which the search space is mapped where the set of PRB pairs enabling localized or distributed mapping of the search space to the set of PRB pairs.

According to one embodiment of this aspect, the plurality of sCCE are consecutive sCCEs. According to one embodiment of this aspect, another search space region to be monitored by a second wireless device in the communication network is assigned. Another bitmap indicating at least one of the plurality of downlink control channel candidates for at least one aggregation level to monitor is transmitted to the second wireless device. According to one embodiment of this aspect, the at least one of the downlink control channel candidates for the second wireless device to monitor partially overlaps with the at least one of the downlink control channel candidates for the first wireless device to monitor. According to one or more embodiment, the bitmap is a bitmap field.

According to another aspect of the disclosure, a wireless device for configuration of a downlink control channel for a short transmission time interval, sTTI, in a communication network is provided. The wireless device includes processing circuitry configured to receive a bitmap corresponds to an assigned search space region to be monitored by the wireless device in the communication network where the search space region including a plurality of downlink control channel candidates associated with a plurality of aggregation levels where each of the plurality of downlink control channel candidates having at least one corresponding short Control Channel Element, sCCE. The processing circuitry is further configured to monitor the search space region based on the bitmap, the bitmap indicating at least one of a plurality of downlink control channel candidates for at least one aggregation level to monitor.

According to one embodiment of this aspect, the bitmap includes a plurality of groups of bits, each group of bits corresponding to a respective one of the plurality of aggregation levels. According to one embodiment of this aspect, each group of bits indicates sCCEs for an aggregation level to monitor. According to one embodiment of this aspect, the plurality of aggregation levels include at least aggregation levels 1, 2 and 4. According to one embodiment of this aspect, the bitmap indicates to monitor a subset of configured sCCEs for at least one of the plurality of aggregation levels. According to one or more embodiments, the bitmap includes a plurality of bits where each bit corresponds to a respective one of the plurality of aggregation levels.

According to one embodiment of this aspect, the bitmap is transmitted via Radio Resource Control, RRC, signaling. According to one embodiment of this aspect, each downlink control channel candidate is a short Physical Downlink Control Channel, sPDCCH, candidate. According to one embodiment of this aspect, the bitmap corresponds to a set of physical resource block, PRB, pairs to which the search space is mapped, the set of PRB pairs enabling localized or distributed mapping of the search space to the set of PRB pairs. According to one embodiment of this aspect, the plurality of sCCE are consecutive sCCEs. According to one or more embodiments, the bitmap is a bitmap field.

According to another aspect of the disclosure, a method for a wireless device for configuration of a downlink control channel for a short transmission time interval, sTTI, in a communication network is provided. A bitmap corresponding to an assigned search space region to be monitored by the wireless device in the communication network is received where the search space region including a plurality of downlink control channel candidates associated with a plurality of aggregation levels. Each of the plurality of downlink control channel candidates have at least one corresponding short Control Channel Element, sCCE. The search space region is monitored based on the bitmap where the bitmap indicating at least one of a plurality of downlink control channel candidates for at least one aggregation level to monitor.

According to one embodiment of this aspect, the bitmap includes a plurality of groups of bits, each group of bits corresponding to a respective one of the plurality of aggregation levels. According to one embodiment of this aspect, each group of bits indicates sCCEs for an aggregation level to monitor. According to one embodiment of this aspect, the plurality of aggregation levels include at least aggregation levels 1, 2 and 4. According to one or more embodiments, the bitmap includes a plurality of bits where each bit corresponds to a respective one of the plurality of aggregation levels.

According to one embodiment of this aspect, the bitmap indicates to monitor a subset of configured sCCEs for at least one of the plurality of aggregation levels. According to one embodiment of this aspect, the bitmap is transmitted via Radio Resource Control, RRC, signaling. According to one embodiment of this aspect, each downlink control channel candidate is a short Physical Downlink Control Channel, sPDCCH, candidate. According to one embodiment of this aspect, the bitmap corresponds to a set of physical resource block, PRB, pairs to which the search space is mapped, the set of PRB pairs enabling localized or distributed mapping of the search space to the set of PRB pairs. According to one embodiment of this aspect, the plurality of sCCE are consecutive sCCEs. According to one or more embodiments, the bitmap is a bitmap field.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 15 is an example of sPDCCH candidates for two wireless devices sharing the same sTTI search space region in accordance with the principles of the disclosure;

FIG. 16 is an example of sPDCCH candidates for four wireless devices sharing the same sTTI search space region with a reduced set of aggregation levels and/or candidates per wireless device in accordance with the principles of the disclosure;

FIG. 19 is an example of sPDCCH candidates for two UEs sharing the same sTTI search space region.

DETAILED DESCRIPTION

Figure 1:
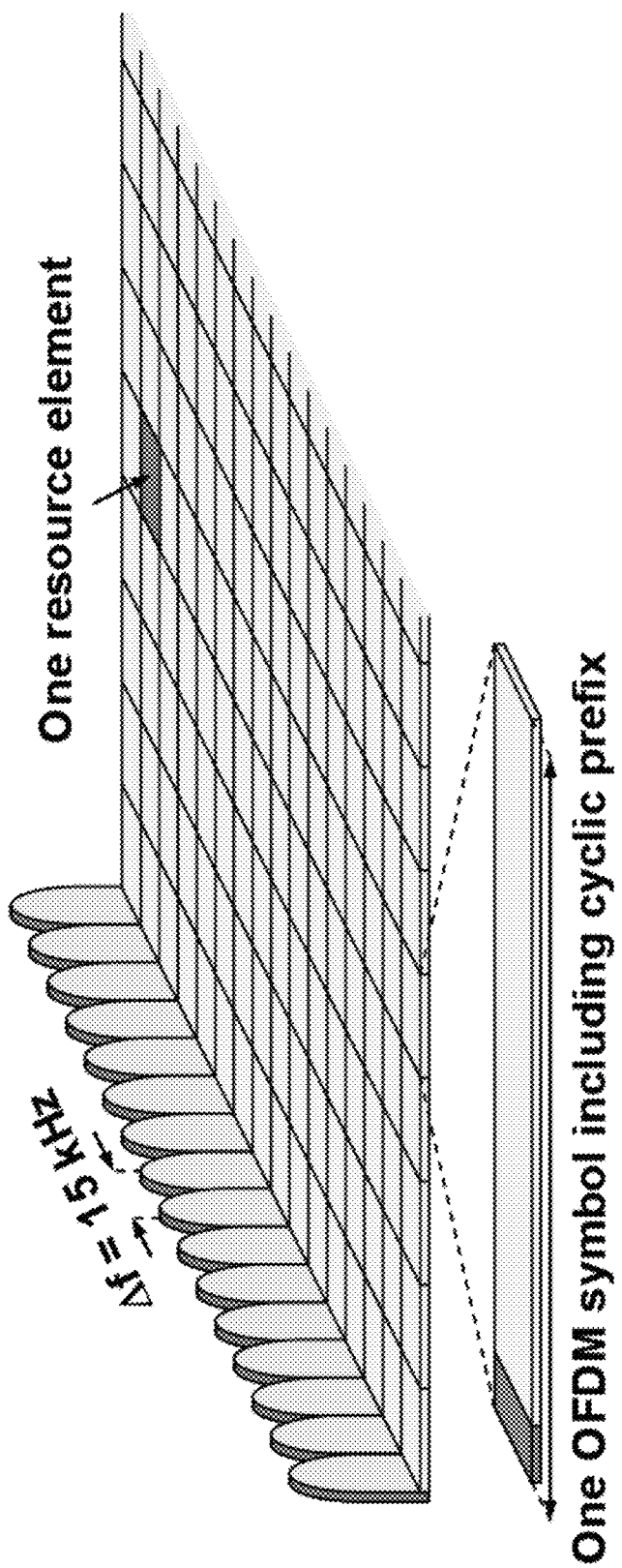
FIG. 1 is a diagram of an LTE downlink physical resource.
Figure 2:
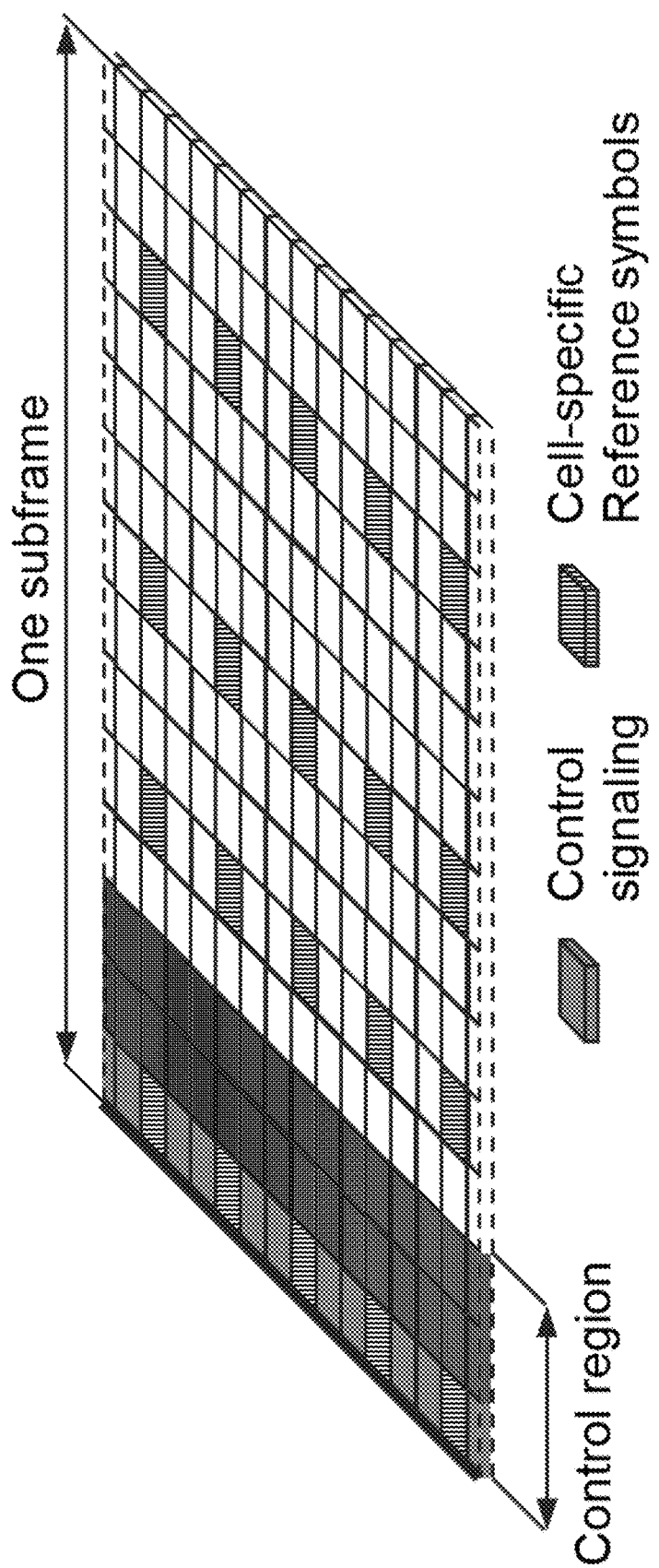
FIG. 2 is a diagram of a downlink subframe.
Figure 3:
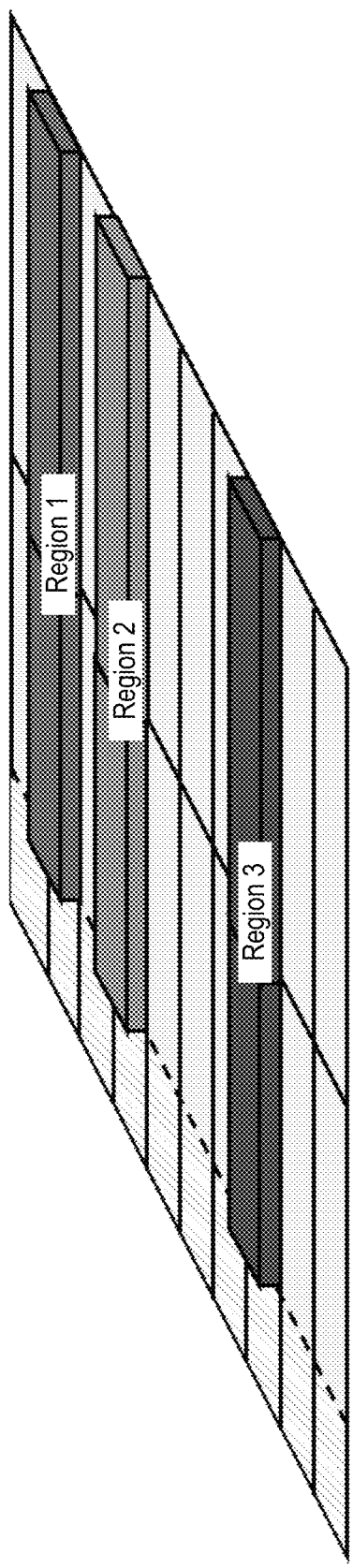
FIG. 3 is a diagram of a downlink subframe showing RB pairs and configuration of three EPDCCH regions.
Figure 4:
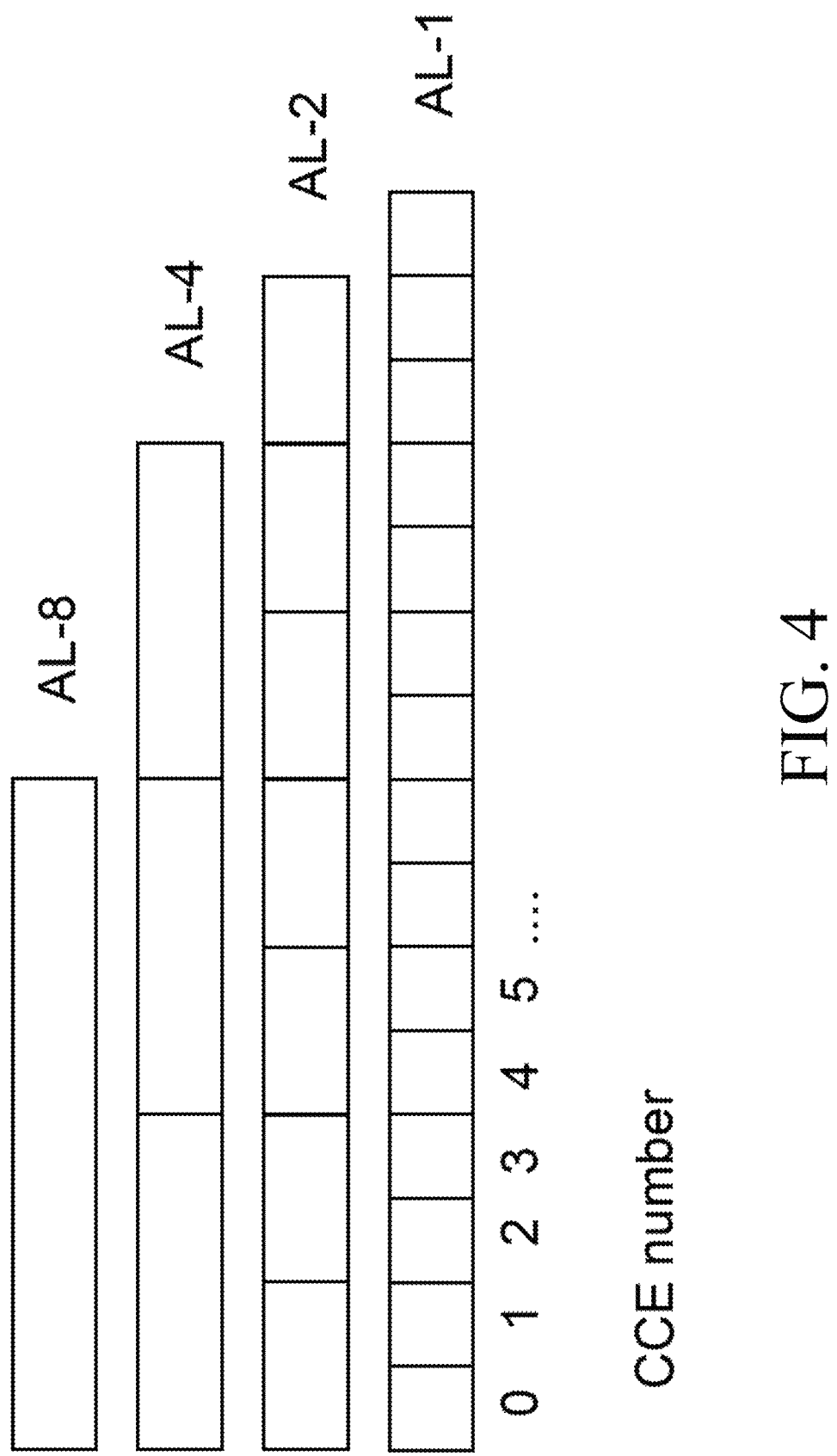
FIG. 4 is a diagram of CCE aggregation i levels (AL) 8, 4, 2 and 1.
Figure 5:
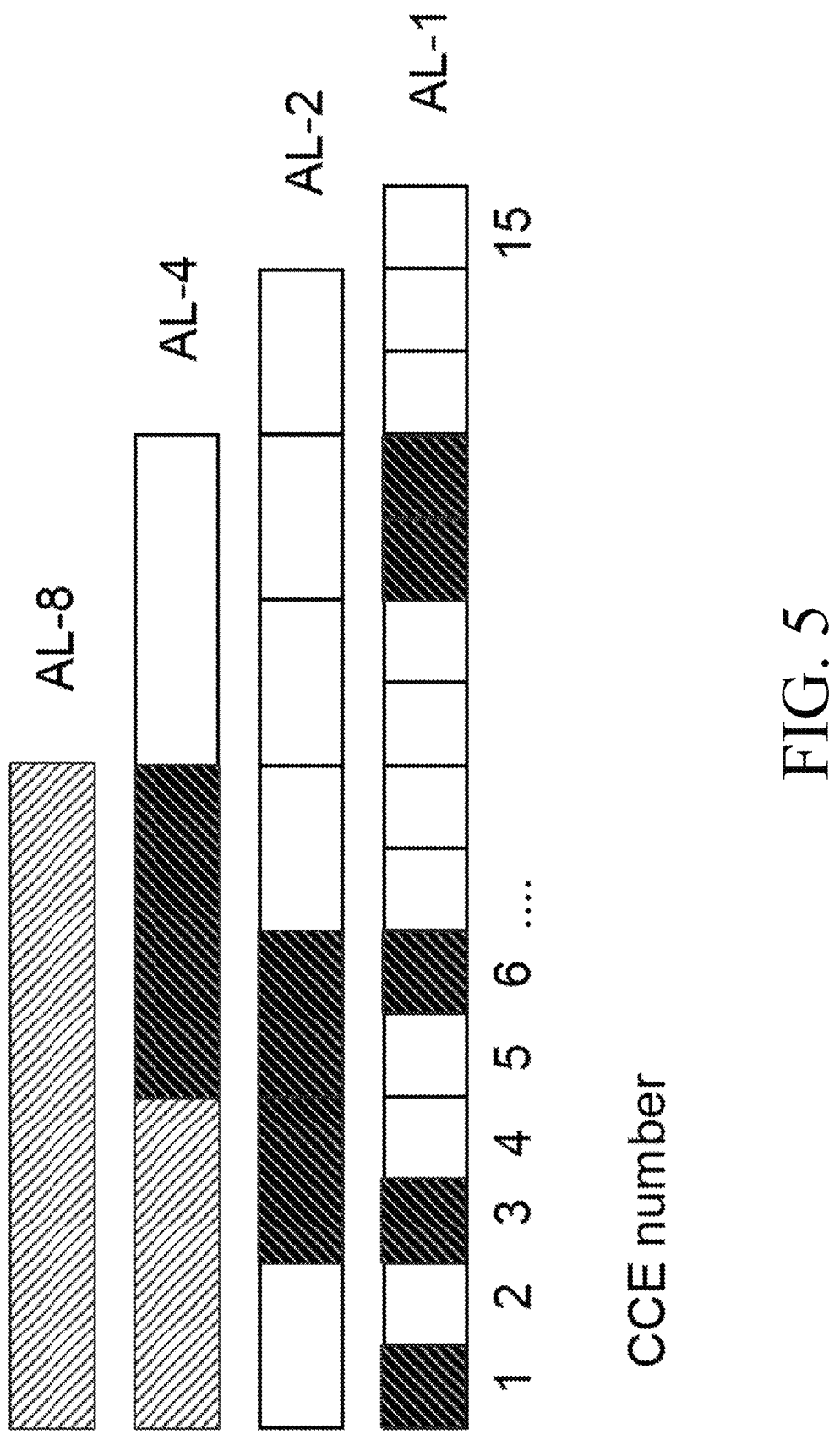
FIG. 5 is a diagram illustrating the search space that wireless device monitors and common search space.
Figure 6:
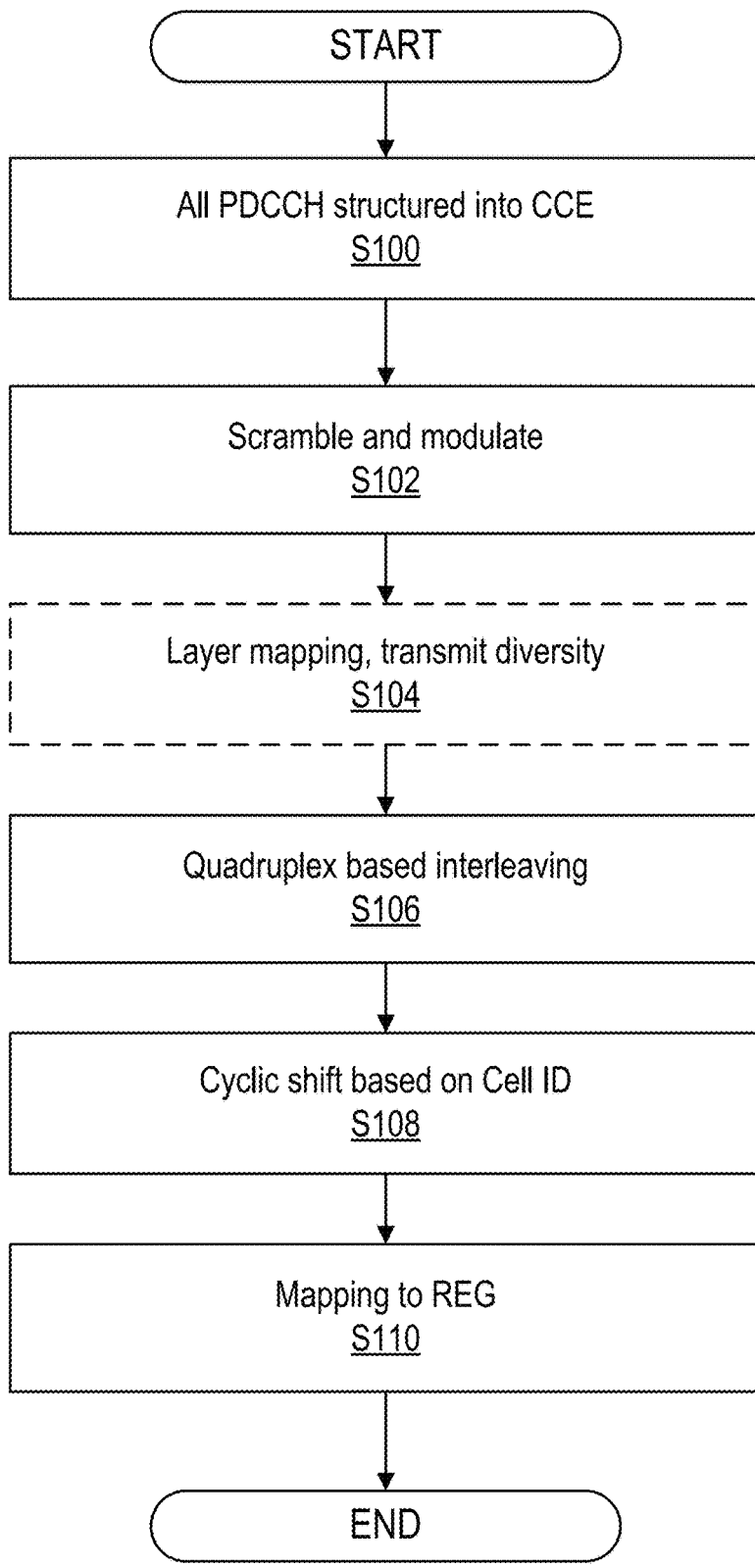
FIG. 6 is a flow diagram of a process for processing PDCCHs to be transmitted in a subframe.

At least one problem with existing solutions is that configurations of the downlink (DL) control channel for short TTI (sTTI), called sPDCCH (PDCCH for short TTI) in this disclosure, are configured over higher layer signaling or pre-defined in the specification. Some of those configurations such as wireless device-specific search space, sPDCCH-PRB-set, aggregation levels and assignment of sPDCCH candidates for sTTI operation still need to be defined to be included in the technical specification or wireless device communication standards.

While the present disclosure is described within the context of LTE, i.e., Evolved Universal Terrestrial Radio Access Network (E-UTRAN), the problems and solutions described herein are equally applicable to wireless access networks and wireless devices implementing other access technologies and standards (e.g., 5G NR). LTE is used as an example technology, and using LTE in the description therefore is particularly useful for understanding the problem and solutions solving the problem, but should not interpreted as a limiting feature of the disclosure.

A first method is described to assign sPDCCH candidates at different aggregation levels for a wireless device within a configured search space region. This method can be based on the specified definition for EPDCCH or the one for PDCCH. This method allows sharing the same search space region among different wireless devices. Furthermore, a second method is described in order to limit the total number of blind decodes to be performed by the wireless devices per each sTTI. Based on the second method, a wireless device can skip determining again the sPDCCH candidates found by the first method. One or more of these methods help facilitate a wireless device's implementation and capabilities. Besides, the methods described herein provide full flexibility to the network node for the transmission of sPDCCH. This is achieved by leaving the freedom to the network node to make the wireless device search space of different wireless devices overlap or not overlap.

Throughout this disclosure, it is assumed that sPDCCH parameters have been pre-configured over higher layer signaling such as RRC for LTE or pre-defined, e.g. in the LTE specifications. Typical sPDCCH parameters are the number of time resources, e.g. OFDM symbols, aggregation levels and nominal number of candidates per aggregation level used for sPDCCH transmission to be monitored by the wireless device. As an example for the short TTI (sTTI) operation, the pre-configured or pre-defined number of OFDM symbols (OS) for sPDCCH is 1, 2 or 3 in the following description. As an example for sTTI operation, the aggregation levels can be considered up to four (i.e. AL 1, 2 and 4), where low aggregation levels, e.g., AL1, AL2, are configured with up to three sPDCCH candidates each and high aggregation level, e.g., AL4, up to two candidates.

Before describing in detail exemplary embodiments, it is noted that the embodiments reside primarily in combinations of apparatus components and processing steps related to assignment of short Physical Downlink Control Channel (sPDCCH) candidates for short Transmission Time Interval (TTI). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 12:
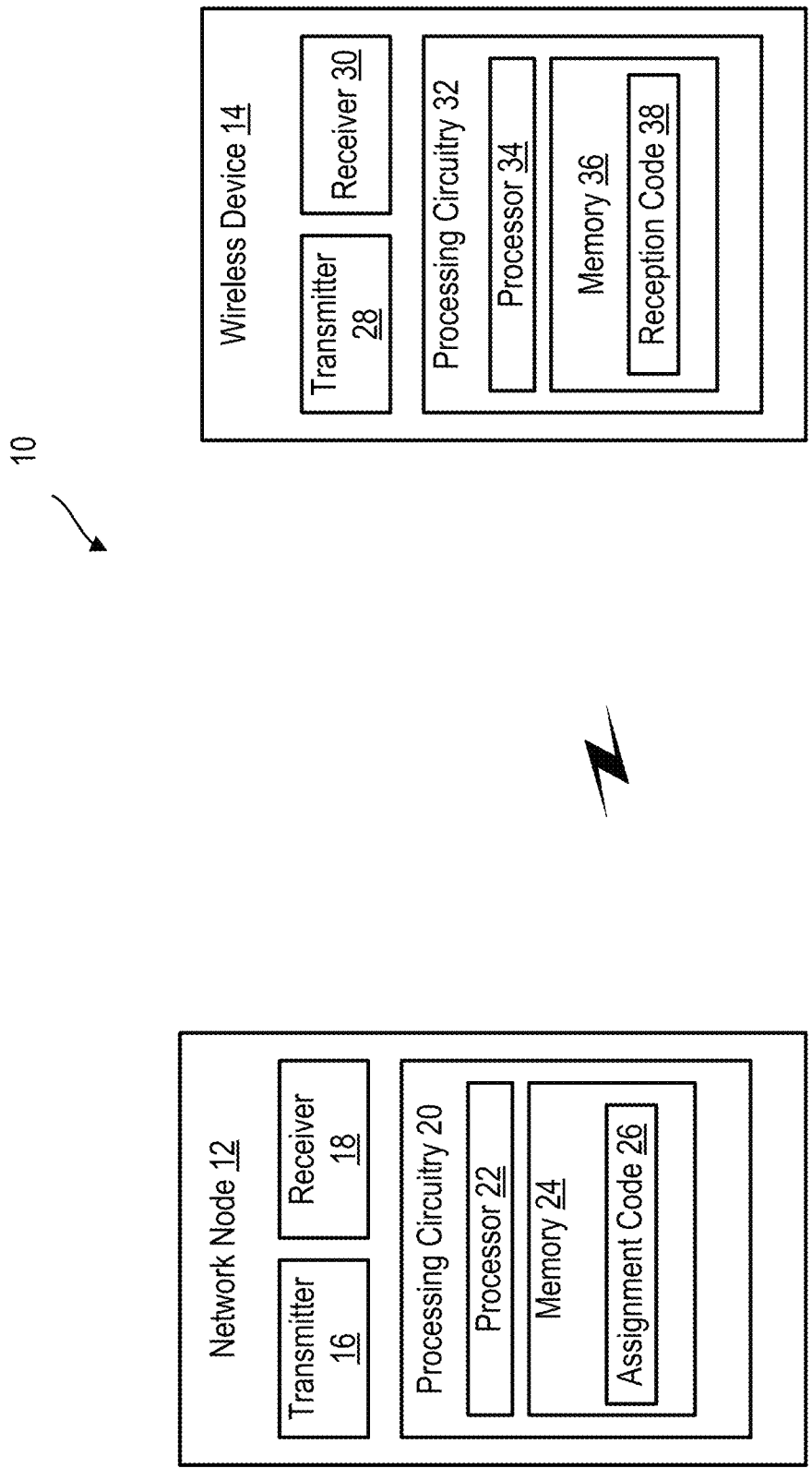
FIG. 12 is a block diagram of an example system for assignment of short Physical Downlink Control Channel (sPDCCH) candidates for short Transmission Time Interval (TTI) in accordance with the principles of the disclosure.

Referring now to drawing figures in which like reference designators refer to like elements there is shown in FIG. 12 is a block diagram of an example system for assignment of short Physical Downlink Control Channel (sPDCCH) candidates for short Transmission Time Interval (TTI) in accordance with the principles of the disclosure, where the system is designated generally as system "10". System 10 includes one or more one or more network nodes 12 and one or more wireless devices 14, in communication with each other via one or more communication networks, paths and/or links using one or more communication protocols such as LTE and/or NR based protocols.

Network node 12 includes transmitter 16 and receiver 18 for communicating with wireless device 14, other network nodes 12 and/or other entities in system 10. In one or more embodiments, transmitter 16 and receiver 18 includes or is replaced by one or more communication interfaces.

Network node 12 includes processing circuitry 20. Processing circuitry 20 includes processor 22 and memory 24. In addition to a traditional processor and memory, processing circuitry 20 may comprise integrated circuitry for processing and/or control, e.g., one or more processors and/or processor cores and/or FPGAs (Field Programmable Gate Array) and/or ASICs (Application Specific Integrated Circuitry). Processor 22 may be configured to access (e.g., write to and/or reading from) memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by processor 22 and/or other data, e.g., data pertaining to communication, e.g., configuration and/or address data of nodes, etc.

Processing circuitry 20 may be configured to control any of the methods and/or processes described herein and/or to cause such methods, signaling and/or processes to be performed, e.g., by network node 12. Processor 22 corresponds to one or more processors 22 for performing network node 12 functions described herein. Network node 12 includes memory 24 that is configured to store data, programmatic software code and/or other information described herein. In one or more embodiments, memory 24 is configured to store assignment code 26. For example, assignment code 26 includes instructions that, when executed by processor 22, causes processor 22 to perform the processes describe herein with respect to network node 12.

The term "network node" 12 used herein can be any kind of network node comprised in a radio network which may further comprise any of base station (BS), radio base station, base transceiver station (BTS), base station controller (BSC), radio network controller (RNC), gNodeB, evolved Node B (eNB or eNodeB), Node B, gNB, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

It is contemplated that the functions of network node 12 and wireless device 14 described herein are not limited to performance by a single physical device and, in fact, can be distributed among several physical devices locally or across a network cloud such as a backhaul network and/or the Internet.

Wireless device 14 includes transmitter 28 and receiver 30 for communicating with network node 12, other wireless devices 14 and/or other entities in system 10. In one or more embodiments, transmitter 28 and receiver 30 include or are replaced by one or more communication interfaces.

Wireless device 14 includes processing circuitry 32. Processing circuitry 32 includes processor 34 and memory 36. In addition to a traditional processor and memory, processing circuitry 32 may comprise integrated circuitry for processing and/or control, e.g., one or more processors and/or processor cores and/or FPGAs (Field Programmable Gate Array) and/or ASICs (Application Specific Integrated Circuitry). Processor 34 may be configured to access (e.g., write to and/or reading from) memory 36, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 36 may be configured to store code executable by processor 34 and/or other data, e.g., data pertaining to communication, e.g., configuration and/or address data of nodes, etc.

Processing circuitry 32 may be configured to control any of the methods and/or processes described herein and/or to cause such methods, signaling and/or processes to be performed, e.g., by wireless device 14. Processor 34 corresponds to one or more processors 34 for performing wireless device 14 functions described herein. Wireless device 14 includes memory 36 that is configured to store data, programmatic software code and/or other information described herein. In one or more embodiments, memory 36 is configured to store reception code 38. For example, reception code 38 includes instructions that, when executed by processor 34, causes processor 34 to perform the processes describe herein with respect to wireless device 14.

Wireless device 14 may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Figure 13:
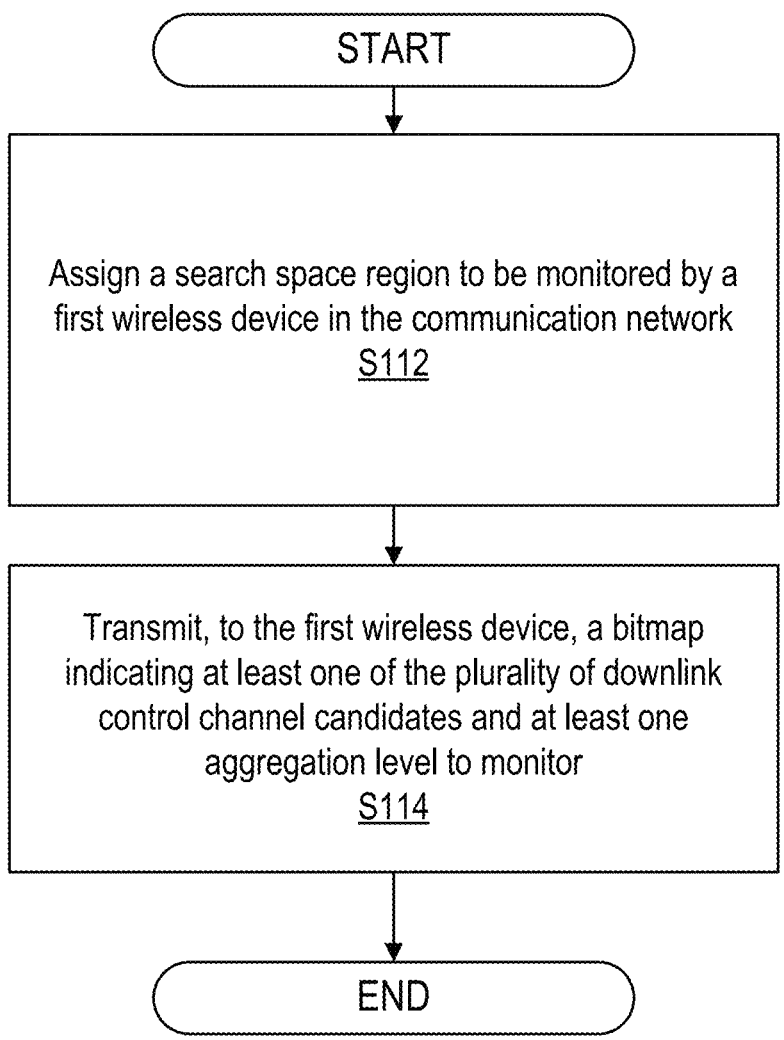
FIG. 13 is a flow diagram of an example assignment process of assignment code 26 in accordance with the principles of the disclosure.

FIG. 13 is a flow diagram of an example assignment process of assignment code 26 in accordance with the principles of the disclosure. Processing circuitry 20 is configured to assign a search space region to be monitored by wireless device 14 in the communication network, as described herein (Block S112). In one or more embodiments, the search space region includes a plurality of downlink control channel candidates associated with a plurality of aggregation levels, and each of the plurality of downlink control channel candidates has at least one corresponding short Control Channel Elements, sCCE. Processing circuitry 20 is configured to transmit, to wireless device 14, a first indicator, e.g. a bitmap or bitmap field, indicating at least one of the plurality of downlink control channel candidates for at least one aggregation level to monitor, as described herein (Block S114). Alternatively or additionally, the first indicator, e.g. the bitmap or bitmap field, may indicate the at least one of the plurality of downlink control channel candidates and the at least one aggregation level to monitor.

According to one or more embodiments, the bitmap includes a plurality of groups of bits, each group of bits corresponding to a respective one of the plurality of aggregation levels. According to one or more embodiments, each group of bits indicates sCCEs for an aggregation level to monitor. According to one or more embodiments, the plurality of aggregation levels include at least aggregation levels 1, 2 and 4. According to one or more embodiments, the bitmap indicates to monitor a subset of configured sCCEs for at least one of the plurality of aggregation levels. In one or more embodiments, a group of bits includes at least two bits. According to one or more embodiments, the bitmap includes a plurality of bits, each bit corresponding to a respective one of the plurality of aggregation levels.

According to one or more embodiments, the bitmap is transmitted via Radio Resource Control, RRC, signaling. According to one or more embodiments, each downlink control channel candidate is a short Physical Downlink Control Channel, sPDCCH, candidate. According to one or more embodiments, the bitmap corresponds to a set of physical resource block, PRB, pairs to which the search space is mapped, the set of PRB pairs enabling localized or distributed mapping of the search space to the set of PRB pairs. According to one or more embodiments, the plurality of sCCE are consecutive sCCEs.

According to one or more embodiments, the processing circuitry 20 is further configured to: assign another search space region to be monitored by a second wireless device 14 in the communication network, and transmit, to the second wireless device 14, another bitmap indicating at least one of the plurality of downlink control channel candidates for at least one aggregation level to monitor. According to one or more embodiments, the at least one of the downlink control channel candidates for the second wireless device to monitor partially overlaps with the at least one of the downlink control channel candidates for the first wireless device to monitor. According to one or more embodiments, the bitmap is a bitmap field.

In a first embodiment, a method in network node 12 for configuration of a downlink control channel for a short Transmission Time Interval, sTTI is provided. A search space region to be monitored by wireless device 14 in a communication network is assigned using a plurality of short Control Channel Elements, sCCE. Network node 12 determines downlink control channel candidates to monitor at configured aggregation levels within the search space region by each wireless device 14 within each sTTI. An sPDCCH candidate at a higher aggregation level to consists of consecutive sCCEs is defined. The same search space region is allowed to be shared among different wireless devices 14.

In one or more embodiments, a method in network node 12 for reducing the number of blind decodes targeted for wireless device 14 is provided by reducing the number of aggregation levels and/or downlink control channel candidates determined in the embodiment, described above with respect to Block S112. A bitmap field, i.e., bitmap, to be transmitted by higher-layer signaling in network node 12 to each wireless device 14 is defined. The aggregation levels and/or downlink control channel candidates determined in the first embodiment for each wireless device 14 are reconfigured by the bitmap field.

In one or more embodiments, the first indicator is a plurality of bits, each bit of the plurality of bits corresponding to a respective one of the plurality of aggregation levels. As detailed above, in one or more embodiments, the first indicator is a bitmap field or bitmap. In one or more embodiments, the first indicator is communicated via Radio Resource Control, RRC, signaling. In one or more embodiments, each downlink control channel candidate is a short Physical Downlink Control Channel, sPDCCH, candidate. In one or more embodiments, processing circuitry 20 is further configured to: assign the search space region to be monitored by a second wireless device 14 in the communication network, and communicate, to the second wireless device 14, a second indicator, e.g. a bitmap or bitmap field, indicating at least one of the plurality of downlink control channel candidates and at least one aggregation level to monitor.

In one or more embodiments, processing circuitry 20 is further configured to: define a bitmap field, the bitmap field configured to reconfigure the at least one of the plurality of downlink control channel candidates to monitor, transmit the bitmap field to the first wireless device 14 to reconfigure the at least one of the plurality of downlink control channel candidates the first wireless device 14 is to monitor, and transmit the bitmap field to the second wireless device 14 to reconfigure the at least one of the plurality of downlink control channel candidates the second wireless device 14 is to monitor. In one or more embodiments, the bitmap field is communicated to the first and second wireless device 14 via Radio Resource Control, RRC, signaling. In one or more embodiments, the reconfiguration includes changing at least one taken from a group comprising of an aggregation level and a control channel candidate.

In one or more embodiments, the second indicator, e.g. the bitmap or bitmap field, indicates to monitor less than all of the plurality of downlink control channel candidates. The first wireless device 14 monitors different sCCEs within the search space region than the sCCEs within the search space region being monitored by the second wireless device 14. In one or more embodiments, the plurality of sCCE are consecutive sCCEs.

Figure 14:
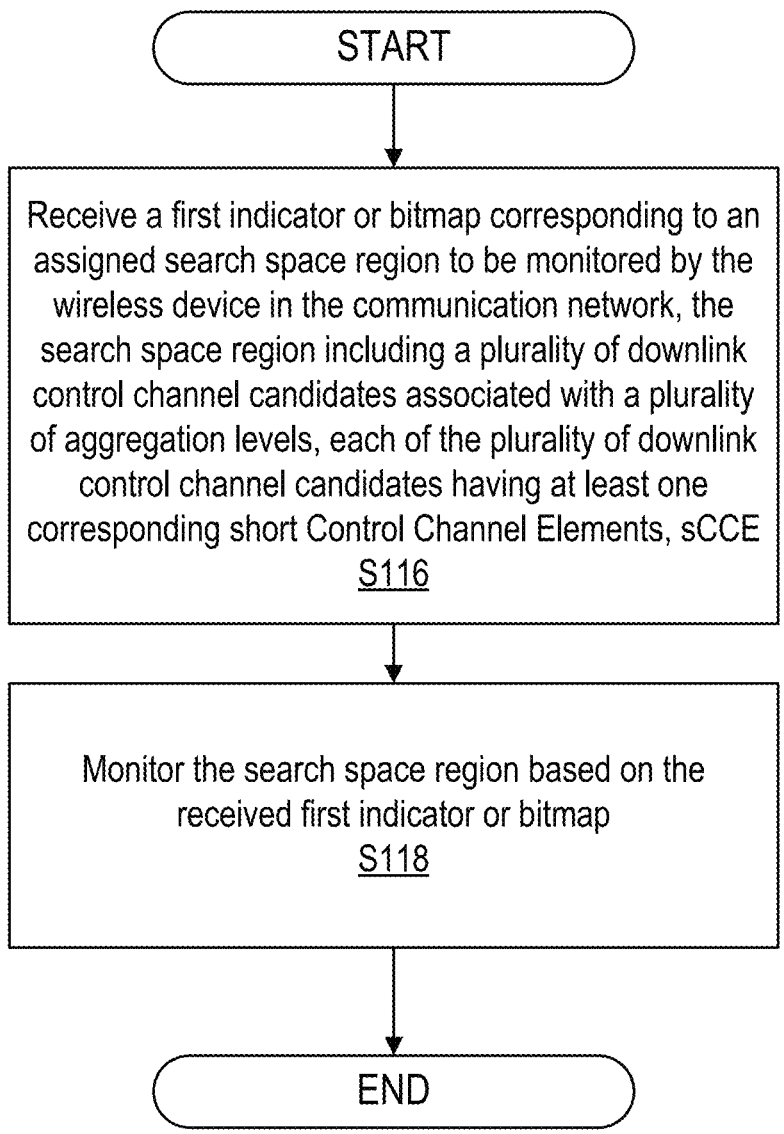
FIG. 14 is a flow diagram of an example reception process of reception code 38 in accordance with the principles of the disclosure.

FIG. 14 is a flow diagram of an example reception process of reception code 38 in accordance with the principles of the disclosure. Processing circuitry 32 is configured to receive a first indicator, e.g. a bitmap or bitmap field, corresponding to an assigned search space region to be monitored by wireless device 14 in the communication network, as described herein (Block Si 16). In one or more embodiments, the search space region including a plurality of downlink control channel candidates associated with a plurality of aggregation levels. In one or more embodiments, each of the plurality of downlink control channel candidates having at least one corresponding short Control Channel Elements, sCCE.

Processing circuitry 32 is configured to monitor the search space region based on the received first indicator, e.g. the received bitmap or bitmap field bitmap, as described herein (Block S118). In one or more embodiments, the first indicator, e.g. the bitmap or bitmap field, indicates at least one of a plurality of downlink control channel candidates for at least one aggregation level, of the search space region to monitor. Alternatively or additionally, the first indicator, e.g. the bitmap or bitmap field, may indicate the at least one of the plurality of downlink control channel candidates and the at least one aggregation level to monitor. In one or more embodiments, the plurality of downlink control channel candidates corresponding to a plurality of short Control Channel Elements, CCEs.

According to one or more embodiments, the bitmap includes a plurality of groups of bits, each group of bits corresponding to a respective one of the plurality of aggregation levels. According to one or more embodiments, each group of bits indicates sCCEs for an aggregation level to monitor. According to one or more embodiments, the plurality of aggregation levels include at least aggregation levels 1, 2 and 4. According to one or more embodiments, the bitmap indicates to monitor a subset of configured sCCEs for at least one of the plurality of aggregation levels. According to one or more embodiments, the bitmap includes a plurality of bits, each bit corresponding to a respective one of the plurality of aggregation levels.

According to one or more embodiments, the bitmap is transmitted via Radio Resource Control, RRC, signaling. According to one or more embodiments, each downlink control channel candidate is a short Physical Downlink Control Channel, sPDCCH, candidate. According to one or more embodiments, the bitmap corresponds to a set of physical resource block, PRB, pairs to which the search space is mapped, the set of PRB pairs enabling localized or distributed mapping of the search space to the set of PRB pairs. According to one or more embodiments, the plurality of sCCE are consecutive sCCEs. According to one or more embodiments, the bitmap is a bitmap field.

In one or more embodiments, the first indicator is a plurality of bits, each bit of the plurality of bits corresponding to a respective one of the plurality of aggregation levels. As detailed above, in one or more embodiments, the first indicator is a bitmap field or bitmap. In one or more embodiments, the first indicator is communicated via Radio Resource Control, RRC, signaling. In one or more embodiments, each downlink control channel candidate is a short Physical Downlink Control Channel, sPDCCH, candidate.

In one or more embodiments, the processing circuitry is further configured to receive a bitmap field, the bitmap field configured reconfigure the at least one of the plurality of downlink control channel candidates the first wireless device 14 is to monitor. In one or more embodiments, the bitmap field is communicated via Radio Resource Control, RRC, signaling.

In one or more embodiments, the reconfiguration includes changing at least one taken from a group comprising of an aggregation level and a control channel candidate. In one or more embodiments, the plurality of sCCE are consecutive sCCEs.

Assignment of sPDCCH Candidates Will be Described in the Following Section

Wireless device 14 supporting sTTI might be configured by higher layer signaling with up to two sPDCCH-PRB-sets containing wireless device 14's specific sTTI search space. Within this wireless device-specific search space region wireless device 14 monitors a set of sPDCCH candidates for each configured aggregation level, e.g. aggregation levels (AL) {1, 2, 4}.

In one embodiment, each sPDCCH-PRB-set consists of a set of physical resource block pairs to which sCCEs are mapped, the sCCEs are numbered from 0 to $N_{sCCE,p,k}-1$, where $N_{sCCE,p,k}$ is the number of sCCEs in sPDCCH-PRB-set p of sTTI k. The full set of sPDCCH candidates are given by a procedure that may be defined in the specification with potentially some configurable parameters. Specification refers to potential future 3GPP releases and/or other works. In one or more embodiments, the location could be fixed, e.g., with control region at a certain frequency band, or configurable. In one or more embodiments, the procedure is based on, for example, in EPDCCH formula or PDCCH, as it is specified in 3GPP TS 36.213, section 9. For instance, the full set of sPDCCH candidates can be based on the EPDCCH formula as described in the introduction section of the disclosure. In this case the sCCEs corresponding to an sPDCCH candidate m within the wireless device-specific sTTI search space can be given b the following definition:

$$L\left\{\left(Y_{p,k} + \left\lfloor \frac{m \cdot N_{sCCE,p,k}}{L \cdot M_p^{(L)}} \right\rfloor + b\right) \bmod \lfloor N_{sCCE,p,k}/L \rfloor\right\} + i$$

where $Y_{p,k}$ refers to wireless device 14 specific offset that can be configured by network node 12 over RRC or can be based on wireless device 14 RNTI. This allows multiplexing of sPDCCH candidates for different wireless devices 14 under sTTI operation. This further allows sharing the same search space region among different wireless devices 14. L is aggregation level and i=0, . . . , L−1. Hence, as part of this embodiment, higher aggregation levels consist of consecutives sCCEs. If wireless device 14 is configured with a carrier indicator field, b is equal to the carrier indicator field value ($n_{CI}$), otherwise b=0. Respectively, the sPDCCH candidates are defined as m=0,1, . . . , $M_p^{(L)}-1$, where $M_p^{(L)}$ is the number of sPDCCH candidates to monitor for each configured aggregation level L within the sPDCCH-PRB-set p.

Alternatively, based on the PDCCH formula, for each serving cell on which sPDCCH is monitored, the sCCEs corresponding to sPDCCH candidate m of wireless device 14 search space $S_{p,k}^{(L)}$ can be given by $$L\{(Y_{p,k}+m') \bmod \lfloor N_{sCCE,k}/L \rfloor\} + i$$

where i=0, . . . , L−1 and $Y_{p,k}$ is wireless device 14 specific offset that can be configured by the network over RRC or can be based on wireless device 14 RNTI. If the monitoring wireless device 14 is configured with carrier indicator field then m'=m for $n_{CI}=0$ and $$m' = m + \sum_{x=0}^{n_{CI}-1} M_x^{(L)}$$

where $n_{CI}$ is the carrier indicator field value and $M_x^{(L)}$ is the reference number of sPDCCH candidates for a carrier indicator field value "x". Otherwise, if the monitoring wireless device 14 is not configured with carrier indicator field then m'=m, where m=0, . . . , $M^{(L)}-1$. $M^{(L)}$ is the number of sPDCCH candidates to monitor in the given search space for the scheduled serving cell.

As an example, FIG. 15 shows the candidates for two wireless device 14s (wireless device 14-0, i.e. UE0, and wireless device 14-1, i.e., UE1) configured by network node 12 to share the same sTTI search space region. This means that both wireless devices 14 are configured with the same sPDCCH-PRB-set. The sPDCCH-PRB-set consists of eight sCCE (numbered from 0 to 7) and wireless devices 14 are configured with a total of eight sPDCCH candidates to be monitored for each short TTI. The aggregation levels and number of sPDCCH candidates per AL configured by network node 12 for both wireless devices 14 are the same: L={1, 2, 4} and $M_p^{(L)}$={3, 3, 2}. Wireless device 14 specific offset for wireless device 14-0, i.e., UE0, is $Y_{p,k\_UE0}=0$, and the wireless device 14 specific offset for wireless device 14-1, i.e., UE1 is $Y_{p,k\_UE0}=1$.

In this example, the assignment of the full set of sPDCCH candidates is based on the first definition given above, i.e. EPDCCH-based. As shown in FIG. 15, {A, B, C} represent the AL sPDCCH candidates, wherein A corresponds to candidate m=0, B to m=1 and C to m=2. {D, E, F} are the AL2 candidates, wherein D corresponds to candidate m=0, E to m=1 and F to m=2. Likewise, {G, H} are the AL4 candidates to be monitored by wireless device 14-0, i.e., UE0, and wireless device 14-1, i.e., UE1, respectively. For instance, wireless device 14-0, i.e., UE0, may monitor sCCE #0 (candidate A), sCCE #2 (candidate B), and sCCE #5 (candidate C) at AL1 within the given sPDCCH-PRB-set. On the other hand, wireless device 14-1, i.e., UE1, may monitor sCCE #1 (candidate A), sCCE #3 (candidate B), and sCCE #6 (candidate C) at AL1 within the given sPDCCH-PRB-set. As observed, the higher the AL the higher the overlapping of sPDCCH candidates between the wireless devices 14 sharing the same search space region. Hence, network node 12 should allocate properly the wireless device's sPDCCH taking into account the allocation for all wireless devices 14 sharing the same search space region.

Reduction of wireless device's sPDCCH candidates over RRC signaling will be described in the following section:

As described in the introduction section of the disclosure, short TTI operation aims to keep the additional number of candidates and attempts of blind decodes (BD) within 1 ms subframe as low as possible. This facilitates the wireless device 14 implementation. In the previous example in section 5.1 the low aggregation levels, i.e. AL 1 and AL 2, includes up to three sPDCCH candidates and the high aggregation level, i.e. AL 4, up to two candidates. Although the number of sPDCCH candidates per AL is low, it still leads to a high total number of blind decodes to be performed by wireless device 14 within 1 ms subframe. For instance, the total number of blind decodes per sTTI per wireless device 14 is equal to eight BDs, i.e., 48 BDs in 1 ms subframe, in the previous example. This uses significant wireless device 14 processing capabilities to be achieved. If an additional sPDCCH-PRB-set is configured for wireless device 14, the number of BDs will be further increased. Thereby, it might not be reached under different wireless device 14 conditions within the desirable processing times. Therefore, as an enhanced embodiment of this disclosure and in order to reduce the number of blind decodes targeted for wireless device 14, network node 12 over RRC signaling can further reduce the total number of sPDCCH candidates configured for wireless device 14 in a specific search space at aggregation level L in sPDCCH-PRB-set. For that, based on the total number of sPDCCH candidates configured for wireless device 14, a parameter is defined to indicate the sPDCCH candidates per AL to be monitored in the given sPDCCH-PRB-set. This parameter can be transmitted to wireless device 14 over RRC signaling. Hence, wireless device 14 can skip determining again the sPDCCH candidates per each configured aggregation level. Instead of that, wireless device 14 takes into account the already known sPDCCH candidates (determined as described in section titled "Assignment of sPDCCH candidates") and monitors only the signaled candidates per AL.

Assuming that up to three sPDCCH candidates are considered for low aggregation levels, e.g. AL1, AL2, up to three bits can be then defined for the reduction of blind decodes. For high aggregation levels, e.g., AL4, two sPDCCH candidates can be considered, i.e., up to two bits can be defined. If higher aggregation levels are further considered, e.g., AL8, there may be only one sPDCCH candidate due to the high control overhead that such aggregation level represents. Thus, one bit can be defined for this case. Hence, up to eight bits can be defined for this RRC parameter.

Figure 16:
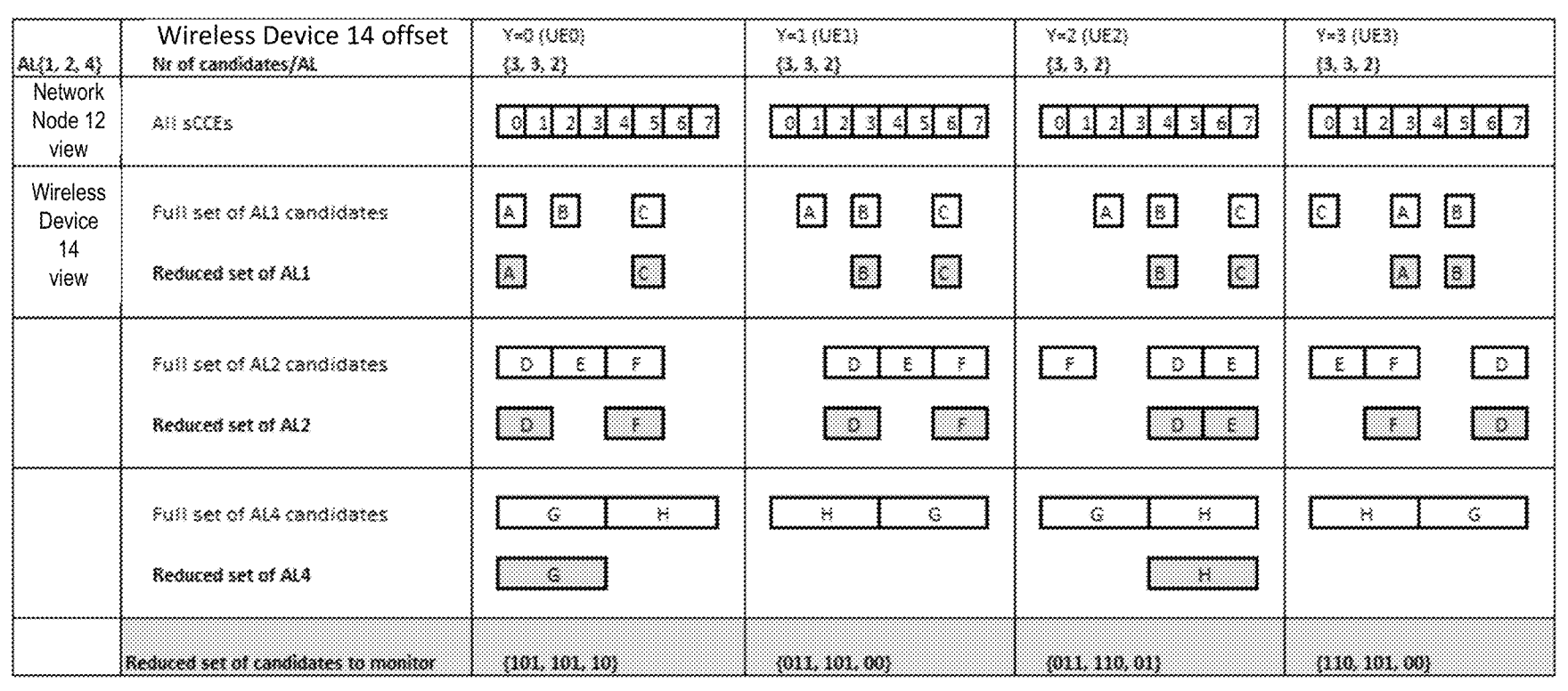

An example of reducing the set of aggregation levels and/or sPDCCH candidates for four wireless devices 14 sharing the same sTTI search space region with a reduced set of aggregation levels and/or candidates is depicted in FIG. 16. In this example, four wireless devices 14 are configured by network node 12 to share the same sTTI search space region, i.e., wireless devices 14 are configured with the same sPDCCH-PRB-set with 8 sCCEs. Wireless device 14-0, i.e., UE0, is defined with $Y_{p,k\_UE0}=0$, wireless device 14-1, i.e., UE1, with $Y_{p,k\_UE1}=1$, UE2 with $Y_{p,k\_UE2}=2$, and UE3 with $Y_{p,k\_UE3}=3$. Furthermore, the four wireless devices 14 are configured with a total of eight sPDCCH candidates to be monitored for each sTTI. The aggregation level set is L={1, 2, 4} and the number of candidates per AL is $M_p^{(L)}$={3, 3, 2} for all wireless device 14.

Figure 7:
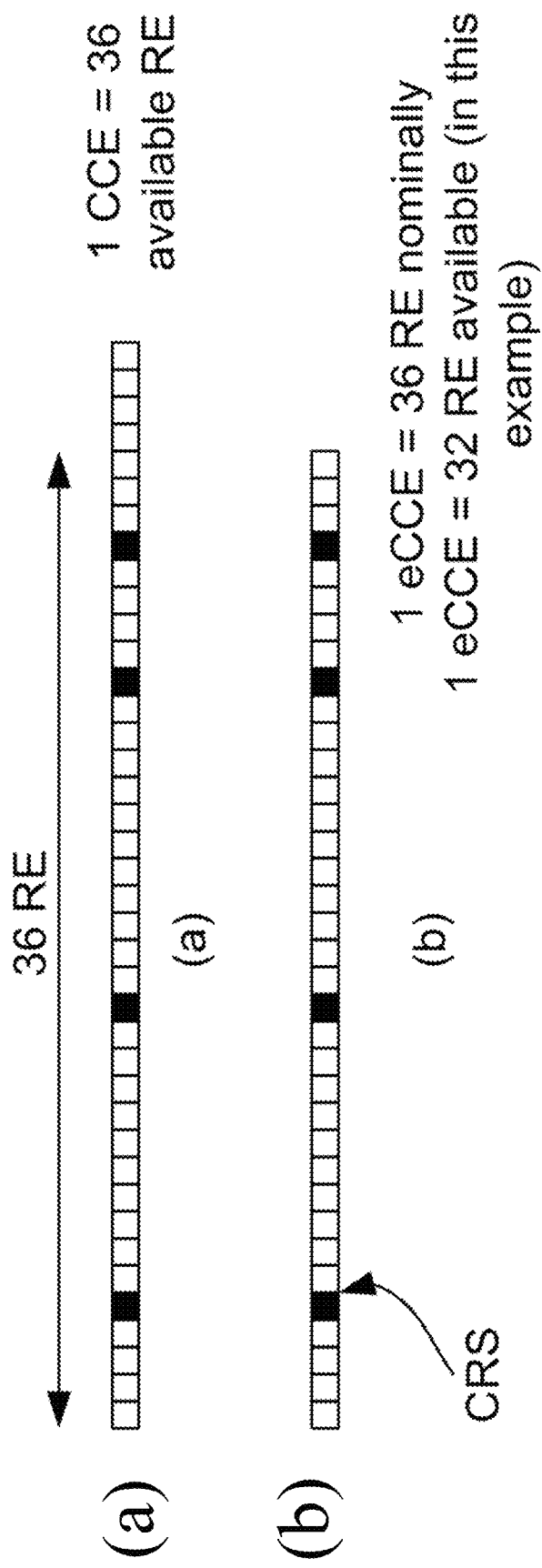
FIGS. 7a and 7b are diagrams of the differences between CCE and eCCE.
Figure 8:
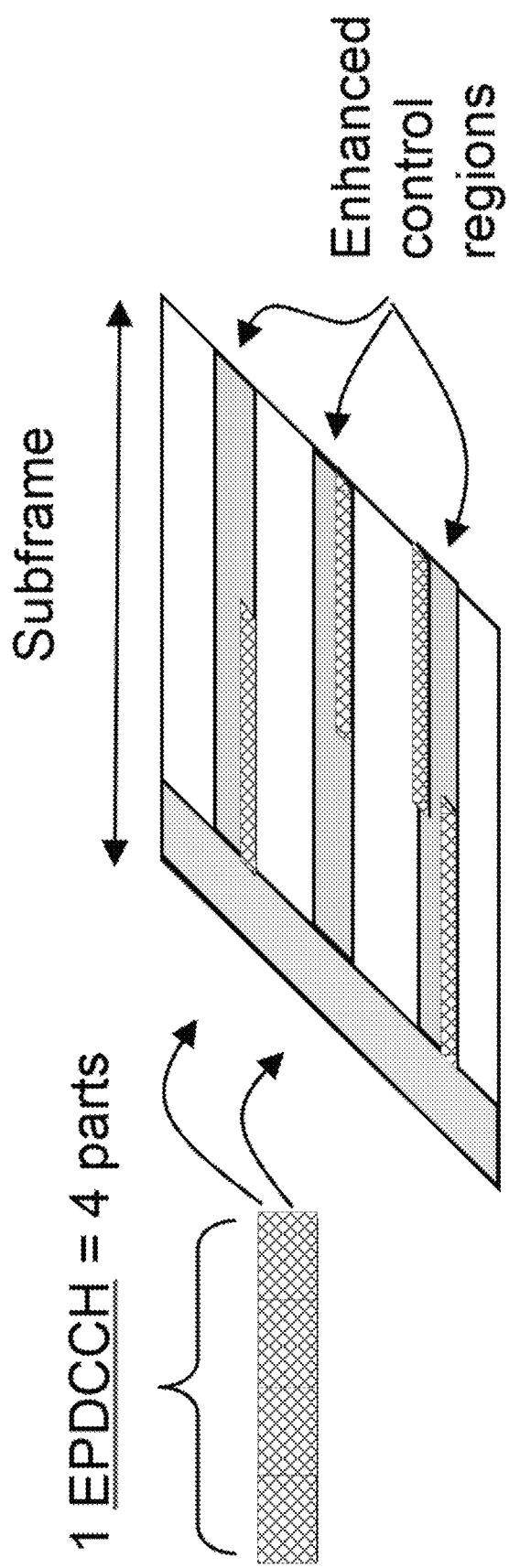
FIG. 8 is a diagram of a downlink subframe where EPDCCH is mapped to multiple enhanced control regions.
Figure 9:
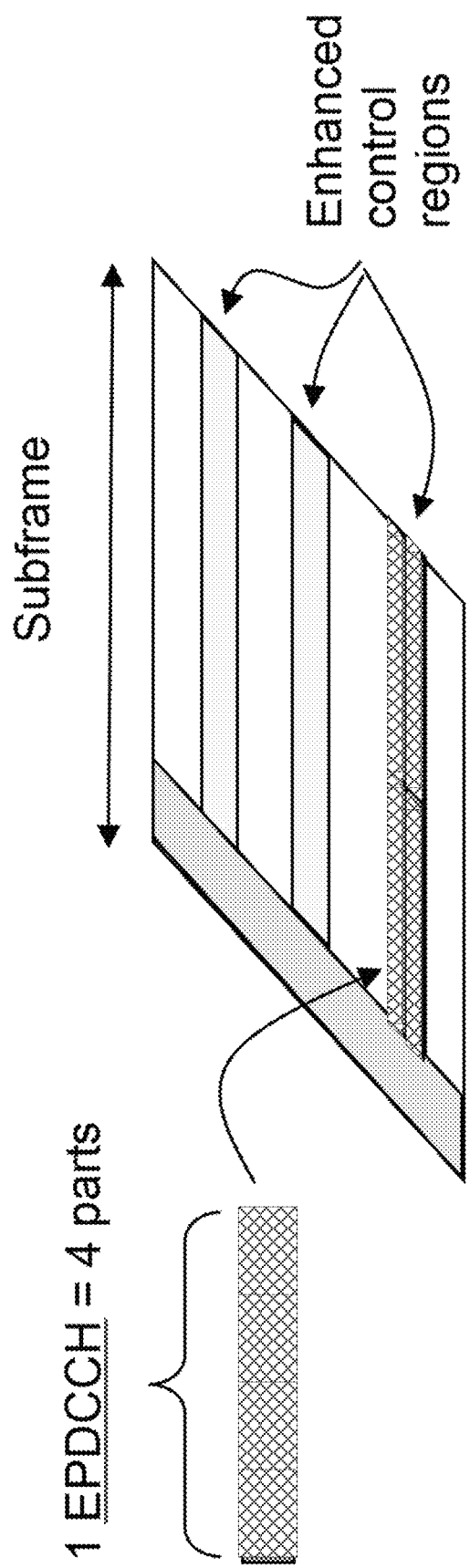
FIG. 9 is a diagram of a downlink subframe where eCCEs are mapped to one of the enhanced control regions.
Figure 10:
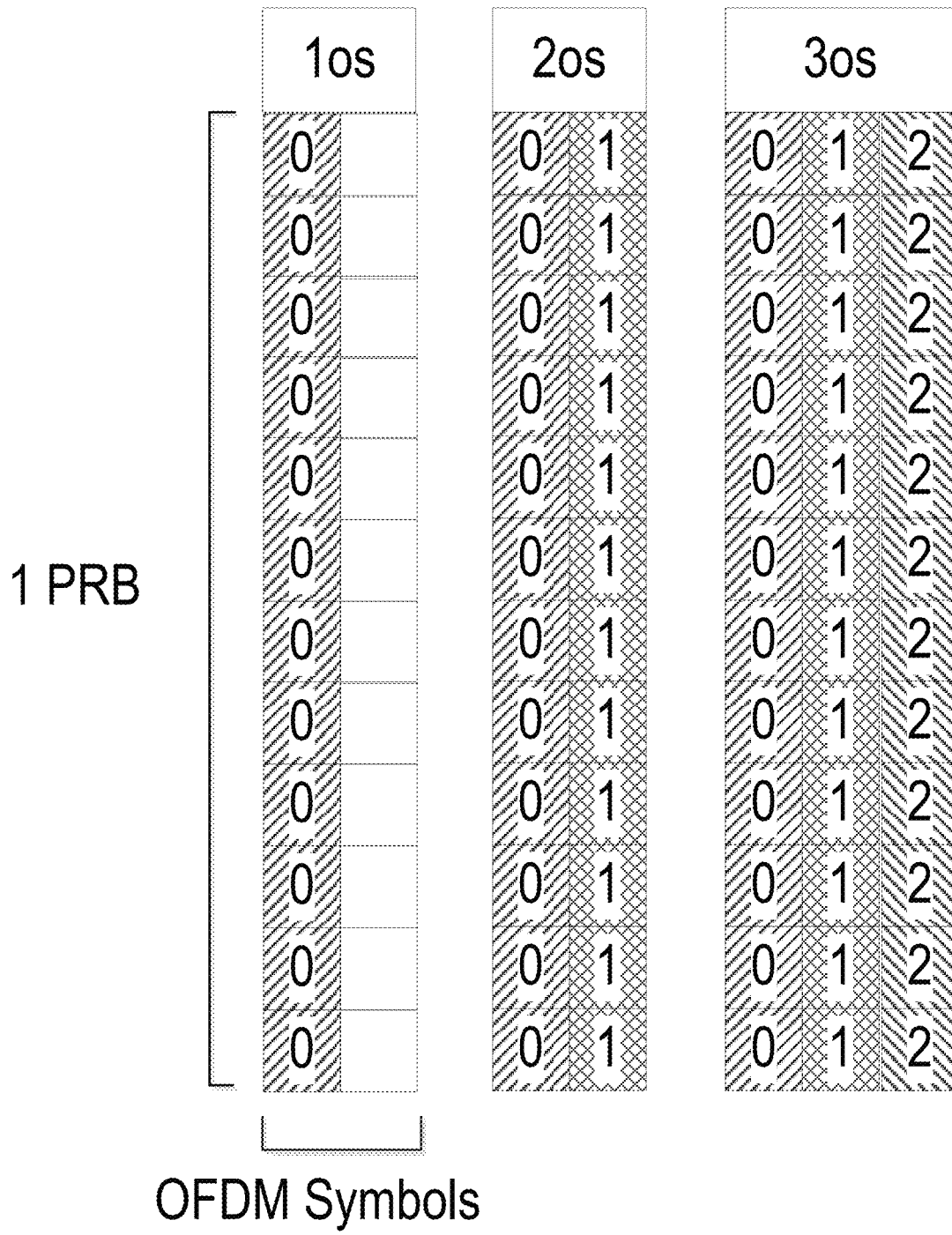
FIG. 10 is a diagram of sREG configuration based on twelve REs within one OFDM for one OFDM symbol sPDCCH, two OFDM symbol sPDCCH and three OFDM symbol sPDCCH.
Figure 11:
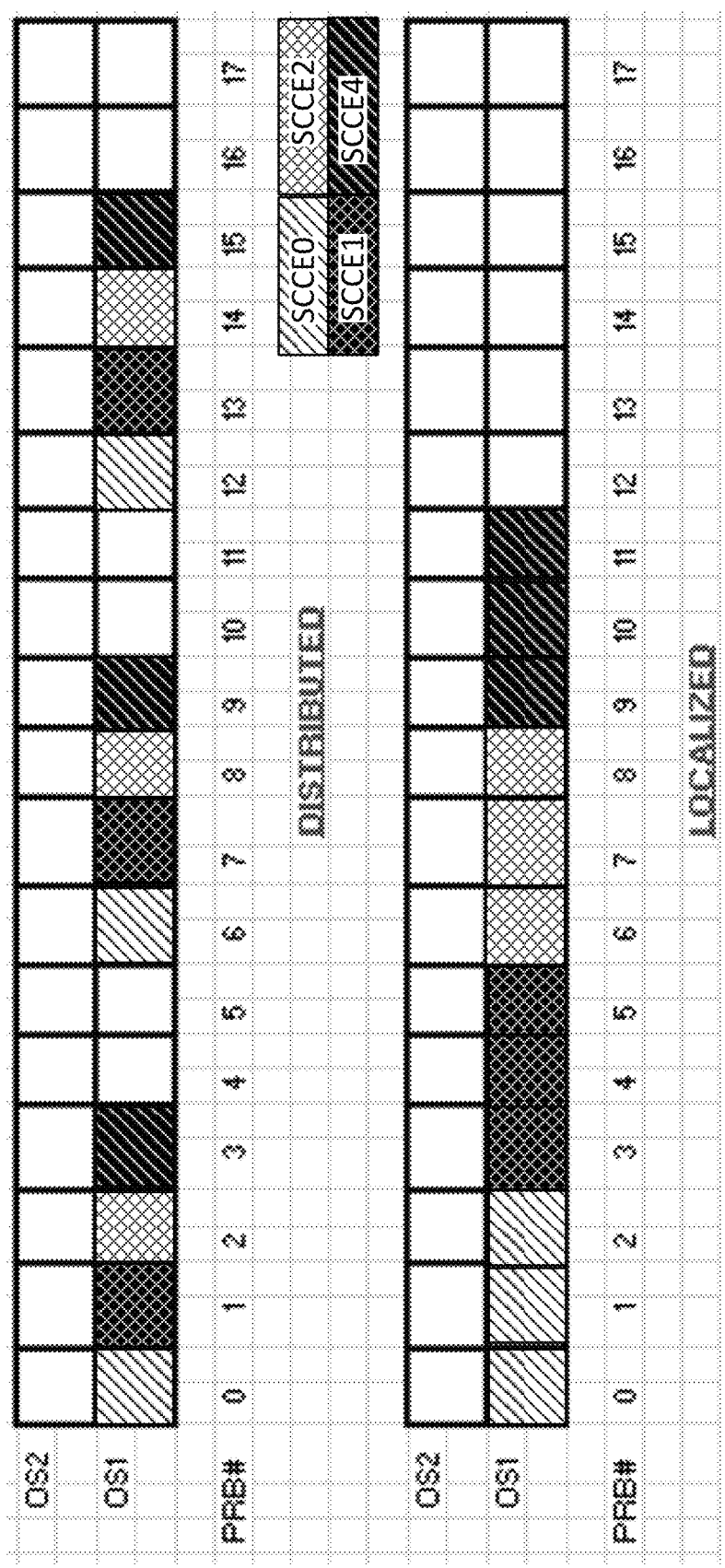
FIG. 11 is a diagram of distributed and localized configurations for four sCCE composed of three sREGs each within one os-sPDCCH-PRB-set.

As shown in FIG. 16, the full set of sPDCCH candidates per aggregation level for each wireless device 14 is initially determined by the definition described above in the "Assignment of sPDCCH candidates" section. As described before, {A, B, C} represent the AL 1 candidates, {D, E, F} AL2 candidates and {G, H} AL4 candidates. Therefore, in order to reduce the number of blind decodes, the network node 12 can configure based on wireless device 14's conditions a reduced set of aggregation levels and/or candidates over a RRC signaling. For instance, and as illustrated in FIG. 14 for the case of a total of eight sPDCCH candidates, a parameter with eight bits $b_0b_1b_2b_3b_4b_5b_6b_7$ is transmitted per wireless device 14, wherein $b_0b_0b_2$ refer to AL1 candidates {A, B, C}, $b_3b_4b_5$ to AL2 candidates {D, E, F}, and $b_6b_7$ to AL4 candidates {G, H}. Each one of the bits $b_0b_1b_2$, the bits $b_3b_4b_5$ and the bits $b_6b_7$ may correspond to a group of bits. As an example, for wireless device 14-0, i.e., UE0, is signaled 10110110 (for simplicity, it is shown as {101, 101, 10} in FIG. 14 (FIG. 7)). Hence, wireless device 14-0 monitors only {A, C, D, F, G} candidates, i.e., a total of five BDs per sTTI. As it is depicted for wireless device 14-1 (UE1) and wireless device 14-3 (UE3), AL4 candidate bits are set to 0, i.e., these wireless devices 14 can skip monitoring AL4 candidates. Thus, wireless device 14-1 and wireless device 14-3 may perform only four BDs.

Therefore, the disclosure advantageously provides definition of the assignment of sPDCCH candidates for wireless devices 14 sharing the same search space region in sTTI operation, and re-configuration of aggregation levels and/or sPDCCH candidates over RRC signaling for wireless device 14 in order to reduce the number of blind decodes to be performed by wireless device 14 each sTTI.

Figure 17:
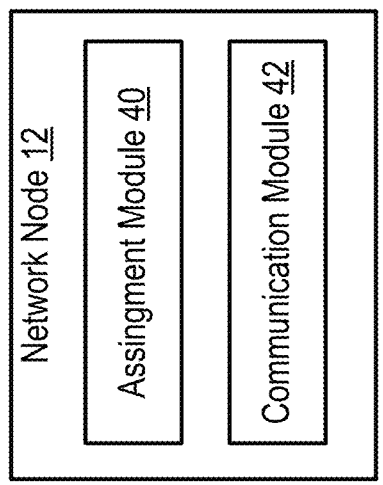
FIG. 17 is a block diagram of another example network node in accordance with the principles of the disclosure.

FIG. 17 is another example of network node 12 in accordance with the principles of the disclosure. Network node 12 includes assignment module 40 configured to assign a search space region to be monitored by a first wireless device in the communication network, as described herein. In one or more embodiments, the search space region including a plurality of downlink control channel candidates associated with a plurality of aggregation levels. Network node 12 includes communications module 42 configured to communicate, to wireless device 14, an indicator indicating at least one of the plurality of downlink control channel candidates and at least one aggregation level, of the search space region to monitor, as described herein.

Figure 18:
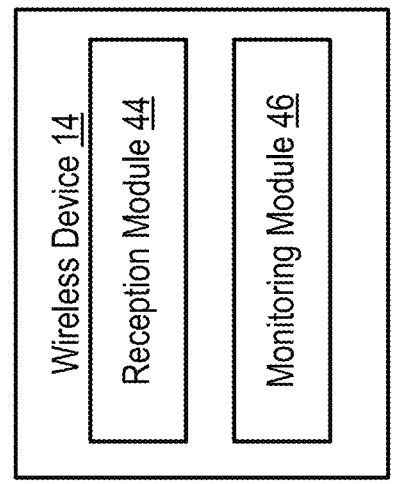
FIG. 18 is a block diagram of another example wireless device in accordance with the principles of the disclosure.

FIG. 18 is another example of wireless device 14 in accordance with the principles of the disclosure. Wireless device 14 includes reception module 44 configured to receive an indicator corresponding to an assigned search space region to be monitored by wireless device 14 in the communication network, as described herein. In one or more embodiments, the search space region includes a plurality of downlink control channel candidates associated with a plurality of aggregation levels. Wireless device 14 includes monitoring module 46 configured to monitor the search space region based on the received indicator, as described herein. In one or more embodiments, the indicator indicates at least one of a plurality of downlink control channel candidates and at least one aggregation level, of the search space region to monitor. In one or more embodiments, the plurality of downlink control channel candidates corresponding to a plurality of short Control Channel Elements, CCEs.

Some Embodiments Include:

Embodiment A. A method in a network node for configuration of a downlink control channel for a short Transmission Time Interval, sTTI, the method comprising:
  assigning a search space region to be monitored by a wireless device in a communication network by means of a number of short Control Channel Elements, sCCE,
  determining downlink control channel candidates to monitor at configured aggregation levels within the search space region by each wireless device within each sTTI,
  defining a sPDCCH candidate at a higher aggregation level to consists of consecutive sCCEs, and
  allowing same search space region to be shared among different wireless devices.

Embodiment B. A method in a network node for reducing the number of blind decodes targeted for a wireless device 14 by reducing the number of aggregation levels and/or downlink control channel candidates in Embodiment 1. The method comprising:

defining a bitmap field to be transmitted by higher-layer signaling in the network node 12 to each wireless device 14, and re-configuring by the bitmap field the aggregation levels and/or downlink control channel candidates determined by Embodiment 1 for each wireless device 14.

Some Other Embodiments

In one aspect of the disclosure, a network node 12 for configuration of a downlink control channel for a short transmission time interval, sTTI, in a communication network is provided. The network node 12 includes processing circuitry 20 configured to: assign a search space region to be monitored by a first wireless device 14 in the communication network. The search space region includes a plurality of downlink control channel candidates associated with a plurality of aggregation levels. Each of the plurality of downlink control candidates has at least one corresponding short Control Channel Element, sCCE. Processing circuitry 20 is further configured to transmit, to the first wireless device 14, a first indicator, e.g. a bitmap or bitmap field, indicating at least one of the plurality of downlink control candidates for at least one aggregation level to monitor. Alternatively or additionally, the first indicator, e.g. the bitmap or bitmap field, may indicate the at least one of the plurality of downlink control candidates and the at least one aggregation level to monitor. In some embodiments, the terms "downlink control candidates" and "downlink control channel candidates" may be used interchangeably.

According to one embodiment of this aspect, the first indicator is a plurality of bits, each bit of the plurality of bits corresponding to a respective one of the plurality of aggregation levels. As detailed above, in one or more embodiments, the first indicator is a bitmap or bitmap field. According to one embodiment of this aspect, the first indicator is transmitted via Radio Resource Control, RRC, signaling. According to one embodiment of this aspect, each downlink control candidate is a short Physical Downlink Control Channel, sPDCCH, candidate.

According to one embodiment of this aspect, the processing circuitry 20 is further configured to assign the search space region to be monitored by a second wireless device 14 in the communication network, and transmit, to the second wireless device 14, a second indicator, e.g. a bitmap or bitmap field, indicating at least one of the plurality of downlink control candidates and at least one aggregation level to monitor. According to one embodiment of this aspect, the processing circuitry 20 is further configured to: define a bitmap field (e.g. the bitmap field or bitmap explained in connection with the first wireless device 14), the bitmap field configured to reconfigure the at least one of the plurality of downlink control candidates to monitor, and transmit the bitmap field to the first wireless device 14 to reconfigure the at least one of the plurality of downlink control candidates the first wireless device 14 is to monitor.

According to one embodiment of this aspect, the processing circuitry 20 is further configured to transmit a bitmap field (e.g. the bitmap field or bitmap explained in connection with the second wireless device 14) to the second wireless device 14 to reconfigure the at least one of the plurality of downlink control candidates the second wireless device 14 is to monitor. According to one embodiment of this aspect, the bitmap field is transmitted to at least one of taken from a group consisting of the first wireless device 14 and the second wireless device 14 via Radio Resource Control, RRC, signaling.

According to one embodiment of this aspect, the reconfiguration indicated in the bitmap field includes changing at least one element taken from a group comprising of an aggregation level and a control channel candidate to be used for monitoring. According to one embodiment of this aspect, the bitmap field indicates to monitor less than the all of the plurality of downlink control candidates available for the aggregation level the first wireless device 14 is to use. According to one embodiment of this aspect, the bitmap field comprises a plurality of bits, a number of the bits in the plurality of bits is equal to the number of possible candidates for all possible aggregation level.

According to one embodiment of this aspect, the bits in the bitmap field are ordered according to the aggregation level, starting with the lowest possible aggregation level or the with highest possible aggregation level. According to one embodiment of this aspect, the bits of one aggregation level are ordered in the bitmap field according to an increasing parameter used in the configuration of the search space, specific bits being defined for a specific aggregation level. According to one embodiment of this aspect, the bitmap field is specific for a set of physical resource block pairs to which the search space is mapped, the set of PRB pairs enabling localized or distributed mapping of the search space to the set of PRB pairs.

According to one embodiment of this aspect, the same bitmap field is used for a first and second set of physical resource block pairs to which the search space is mapped, the first set of PRBs enabling localized mapping of the search space to the set of PRB pairs and the second set of PRB pairs enabling distributed mapping of the search space to the set of PRB pairs.

According to one embodiment of this aspect, the second indicator, e.g. the bitmap or bitmap field, indicates to monitor less than all of the plurality of downlink control candidates for the aggregation level. The first wireless device 14 monitors different sCCEs within the search space region than the sCCEs within the search space region being monitored by the second wireless device 14.

According to one embodiment of this aspect, the plurality of sCCE are consecutive sCCEs. According to one embodiment of this aspect, the search space region of the first wireless device 14 and the search space region of the second wireless device 14 is device specific. According to one embodiment of this aspect, the processing circuitry 20 is further configured to: transmit information the first wireless device 14, the information indicating a parameter value used by the wireless device 14 in configuring the candidates of the search space region.

According to another aspect of the disclosure, a method for a network node 12 for configuration of a downlink control channel for a short transmission time interval, sTTI, in a communication network is provided. A search space region to be monitored by a first wireless device 14 in the communication network is assigned. The search space region includes a plurality of downlink control channel candidates associated with a plurality of aggregation levels. Each of the plurality of downlink control channels has at least one corresponding short Control Channel Elements, sCCE. A first indicator indicating at least one of the plurality of downlink control candidates for at least one aggregation level to monitor is transmitted to the first wireless device 14.

According to one embodiment of this aspect, the first indicator is a plurality of bits, each bit of the plurality of bits corresponds to a respective one of the plurality of aggregation levels. According to one embodiment of this aspect, the first indicator is transmitted using RRC signaling. According to one embodiment of this aspect, each downlink control candidate is a short Physical Downlink Control Channel, sPDCCH, candidate. According to one embodiment of this aspect, a search space region to be monitored by a second wireless device 14 in the communication network is assigned. The search space region includes the plurality of downlink control candidates associated with the plurality of aggregation levels. A second indicator, e.g. a bitmap or bitmap field, indicating at least one of the plurality of downlink control candidates and at least one aggregation level to monitor is transmitted to a second wireless device 14.

According to one embodiment of this aspect, a bitmap field is defined. The bitmap field is configured to reconfigure the at least one of the plurality of downlink control candidates to monitor. The bitmap field is transmitted to the first wireless device 14 to reconfigure the at least one of the plurality of downlink control candidates the first wireless device 14 is to monitor. According to one embodiment of this aspect, a bitmap field is transmitted to the second wireless device 14 to reconfigure the at least one of the plurality of downlink control candidates the second wireless device 14 is to monitor. According to one embodiment of this aspect, the bitmap field is transmitted to at least one of taken from a group consisting of the first wireless device 14 and the second wireless device 14 via Radio Resource Control, RRC, signaling.

According to one embodiment of this aspect, the reconfiguration indicated in the bitmap field includes changing at least one element taken from a group comprising of an aggregation level and a control channel candidate to be used for monitoring. According to one embodiment of this aspect, the bitmap field indicates to monitor less than the all of the plurality of downlink control candidates available for the aggregation level the first wireless device 14 is to use. According to one embodiment of this aspect, the bitmap field comprises a plurality of bits, a number of the bits in the plurality of bits is equal to the number of possible candidates for all possible aggregation level.

According to one embodiment of this aspect, the bits in the bitmap field are ordered according to the aggregation level, starting with the lowest possible aggregation level or the with highest possible aggregation level. According to one embodiment of this aspect, the bits of one aggregation level are ordered in the bitmap field according to an increasing parameter used in the configuration of the search space, specific bits being defined for a specific aggregation level.

According to one embodiment of this aspect, the bitmap field is specific for a set of physical resource block pairs to which the search space is mapped. The set of PRB pairs enables localized or distributed mapping of the search space to the set of PRB pairs. According to one embodiment of this aspect, the same bitmap field is used for a first and second set of physical resource block pairs to which the search space is mapped, the first set of PRB pairs enabling localized mapping of the search space to the set of PRB pairs and the second set of PRB pairs enabling distributed mapping of the search space to the set of PRB pairs.

According to one embodiment of this aspect, the second indicator, the bitmap or bitmap field, indicates to monitor less than all of the plurality of downlink control candidates for the aggregation level. The first wireless device 14 monitors different sCCEs within the search space region than the sCCEs within the search space region being monitored by the second wireless device 14. According to one embodiment of this aspect, the plurality of sCCE are consecutive sCCEs.

According to one embodiment of this aspect, the search space region of the first wireless device 14 and the search space region of the second wireless device 14 is device specific. According to one embodiment of this aspect, information is transmitted to the first wireless device 14. The information indicating a parameter value used by the wireless device 14 in configuring the candidates of the search space region.

According to another aspect of the disclosure, a wireless device 14 for configuration of a downlink control channel for a short transmission time interval, sTTI, in a communication network is provided. The wireless device 14 includes processing circuitry 32 configured to: receive a first indicator corresponding to an assigned search space region to be monitored by the wireless device 14 in the communication network. The search space region includes a plurality of downlink control channel candidates associated with a plurality of aggregation levels. Each of the plurality of downlink control candidates has at least one corresponding short Control Channel Elements, sCCE. Processing circuitry 32 is configured to monitor the search space region based on the received first indicator. The first indicator indicates at least one of a plurality of downlink control candidates for at least one aggregation level to monitor.

According to one embodiment of this aspect, the first indicator is a plurality of bits, each bit of the plurality of bits corresponding to a respective one of the plurality of aggregation levels. According to one embodiment of this aspect, the first indicator is communicated via Radio Resource Control, RRC, signaling. According to one embodiment of this aspect, each downlink control candidate is a short Physical Downlink Control Channel, sPDCCH, candidate.

According to one embodiment of this aspect, the processing circuitry 32 is further configured to receive a bitmap field, the bitmap field configured reconfigure the at least one of the plurality of downlink control candidates the first wireless device 14 is to monitor. According to one embodiment of this aspect, the bitmap field is communicated via Radio Resource Control, RRC, signaling. According to one embodiment of this aspect, the reconfiguration includes changing at least one taken from a group comprising of an aggregation level and a control channel candidate. According to one embodiment of this aspect, the plurality of sCCE are consecutive sCCEs.

According to one aspect of the disclosure, a method for a wireless device 14 for configuration of a downlink control channel for a short transmission time interval, sTTI, in a communication network is provided. A first indicator corresponding to an assigned search space region to be monitored by the wireless device 14 in the communication network is received. The search space region includes a plurality of downlink control channel candidates associated with a plurality of aggregation levels. Each of the plurality of downlink control candidates has at least one corresponding short Control Channel Elements, sCCE. The search space region is monitored based on the received first indicator. The first indicator indicates at least one of a plurality of downlink control candidates for at least one aggregation level to monitor.

According to one embodiment of this aspect, the first indicator is a plurality of bits. Each bit of the plurality of bits corresponds to a respective one of the plurality of aggregation levels. According to one embodiment of this aspect, the first indicator is communicated via RRC signaling. According to one embodiment of this aspect, each downlink control candidate is a short Physical Downlink Control Channel, sPDCCH, candidate.

According to one embodiment of this aspect, a bitmap field is received. The bitmap field is configured reconfigure the at least one of the plurality of downlink control candidates the first wireless device 14 is to monitor. According to one embodiment of this aspect, the bitmap field is communicated via Radio Resource Control, RRC, signaling. According to one embodiment of this aspect, the reconfiguration includes changing at least one taken from a group of an aggregation level and a control channel candidate. According to one embodiment of this aspect, the plurality of sCCE are consecutive sCCEs.

According to one aspect of the disclosure, a network node 12 for configuration of a downlink control channel for a short transmission time interval, sTTI, in a communication network is provided. The network node 12 includes an assignment module 40 configured to assign a search space region to be monitored by a first wireless device 14 in the communication network. The search space region includes a plurality of downlink control candidates associated with a plurality of aggregation levels. Each of the plurality of downlink control channel candidates have at least one corresponding short Control Channel Elements, sCCE. Network node 12 includes a communications module 42 configured to transmit, to the first wireless device 14, a first indicator indicating at least one of the plurality of downlink control candidates for at least one aggregation level to monitor.

According to one aspect of the disclosure, a wireless device 14 for configuration of a downlink control channel for a short transmission time interval, sTTI, in a communication network is provided. The wireless device 14 includes a reception module 44 configured to receive a first indicator corresponding to an assigned search space region to be monitored by the wireless device 14 in the communication network. The search space region includes a plurality of downlink control candidates associated with a plurality of aggregation levels each of the plurality of downlink control channel candidates having at least one corresponding short Control Channel Elements, sCCE. The wireless device 14 includes a monitoring module 46 configured to monitor the search space region based on the received first indicator. The first indicator indicates at least one of a plurality of downlink control candidates for at least one aggregation level to monitor.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

In the following, further embodiments according to the present disclosure will be described.

Section 1: Introduction

In RAN1 #86 the following was agreed in [2]:
Legacy PDCCH can be used to transmit sDCI (DCI for sPDSCH and/or sPUSCH).
Quadrature Phase Shift Keying (QPSK) is used for sPDCCH.
Tail biting convolutional coding is used for sPDCCH.
For CRS-based sPDCCH, In time domain,
sPDCCH is transmitted from the first OFDM symbol within an sTTI
sPDCCH is not mapped to the PDCCH region.
For Further Study (FFS) number of OFDM symbols of the sPDCCH
Frequency resource for sPDCCH can be informed by network node 12.

In RAN1 #88bis the following agreements and working assumptions were defined:
Agreements:
An sREG consists of 1 RB within 1 OFDM symbol including REs for CRS and/or DMRS applied to DMRS based sPDCCH
The number of OFDM symbols per RB set for CRS based sPDCCH for 2/3-symbol sTTI is 1 or 2 configured by higher layer
FFS:
Wireless device 14 capability on: The HARQ Ack/UL grant timing dependent on the number of configured symbols for CRS based sPDCCH
The number of OFDM symbols per RB set for CRS based sPDCCH for 1-slot sTTI is 1 or 2 configured by higher layer.
FFS: 3 OFDM symbols
RAN1 may not pursue CDM-F based DMRS pattern for sPDCCH
Working assumptions:
An sREG consists of 1 RB within 1 OFDM symbol including REs for CRS and/or DMRS applied to CRS based sPDCCH (To be confirmed by RAN1 #89).
A sPDCCH RB set can be configured to a wireless device 14 by higher-layer signalling either with distributed or localized mapping of sCCE to sREG.
FFS if more than one set can be distributed/localized.
A wireless device 14 can be configured with one or two sPDCCH RB set(s) containing the wireless device's user-specific sTTI search space.
FFS whether more than two can be configured to a wireless device 14 (To be confirmed by RAN1 #89).

In RAN1 #89 the following agreements were made:
A CRS based sPDCCH RB set can be configured to a wireless device 14 by higher-layer signalling either with distributed or localized mapping of sCCE to sREG
FFS definition of localized mapping
A wireless device 14 can be configured to monitor at most two sPDCCH RB set(s) containing the sTTI USS in an sTTI.
One sPDCCH candidate is contained within one RB set
An sREG consists of 1 RB within 1 OFDM symbol including REs for CRS and/or DMRS applied to CRS based sPDCCH
SFBC is supported for CRS-based sPDCCH
FFS number of antenna ports
Single port DMRS-based sPDCCH demodulation is supported
FFS bundling size
FFS if two port DMRS-based sPDCCH demodulation is supported
FFS bundling size
A sPDCCH RB set can be configured with at least the following information:
A set of RBs
EPDCCH PRB allocation is reused
Transmission scheme (e.g., CRS-based or DMRS-based)
FFS: Dependent on subframe type
Localized or distributed sCCE to sREG mapping (at least for CRS, and, if supported DMRS-based sPDCCH)
FFS: Localized or distributed sPDCCH candidate to sCCE mapping
Number of sPDCCH candidates/aggregation levels of the RB set
FFS: Same or different sPDCCH candidates for different sTTI index
Number of symbols for sPDCCH duration at least in case of CRS-based transmission
RS scrambling sequence (e.g., VCID) in case of DMRS-based transmission
FFS: other information (if needed)
The number of OFDM symbols per RB set for DMRS based sPDCCH for 1-slot sTTI is 2
The number of OFDM symbols for DMRS based sPDCCH for 2/3-symbol sTTI is
2 for 2-symbol sTTI #1,2,3,4
FFS: 3 for 3-symbol sTTI #1 and #5
FFS: sTTI #0

Section 2: Discussion

To schedule sTTI, an sPDCCH needs to be transmitted in each sTTI. In this contribution, we discuss considerations on sTTI wireless device 14 search space such as aggregation levels, candidates to monitor and limitation of number of blind decodes for sTTI wireless devices 14.

Section 2.1: Aggregation Levels

System level evaluations have showed that short TTI is beneficial mostly at low to medium loads [2]. Besides, it was also described in [2] how important it may be to have a flexible sPDCCH region in sTTI. At low to medium loads, only few resources are needed for sPDCCH due to few co-scheduled users and due to high SINR (low interference). It may thus be critical to design sPDCCH so that the amount of occupied resources is adapted to the number of co-scheduled users (in DL and UL) and their required aggregation level, which is expected to remain low. Based on this, three aggregation levels (AL) {1, 2, 4}, are proposed to be supported for short TTI operation. AL 1 and 2 are expected to be used most of the time, while AL 4 is to ensure sTTI operation under temporary high interference or bad channel conditions. However, the number of aggregated sCCE is dependent on how RS overhead is handled in the sCCE definition (details in our companion paper about design aspects of sPDCCH [3]). If the sCCE definition does not take into account the RS overhead, the effective number of usable RE in a sCCE may be low for high RS overhead. In that case, also AL 8 may be considered. If, however, the sCCE definition takes into account the RS overhead, i.e. defining a sCCE to be composed by a higher number of sREGs where the RS overhead is high, the AL does not need to be increased with high RS overhead.

Proposal 1 Three aggregation levels {1, 2, 4} are supported for short TTI operation Based on this, a wireless device 14 should be capable to monitor up to three aggregation levels per sTTI. However, a wireless device 14 may be further configured by higher layers to monitor only a subset of the aggregation levels supported for sTTI operation. For instance, one low aggregation level, i.e. either 1 or 2, for efficient resource utilization in good channel conditions and one high aggregation level, i.e. 4, for low channel quality.

Observation 1 A wireless device 14 can be further configured by higher layers to monitor only a subset of the aggregation levels supported for sTTI operation.

Section 2.2: sPDCCH Candidates and Blind Decodes

In Rel-8, four aggregation levels {1, 2, 4, 8} are defined for PDCCH and the blind decode candidates for each of these aggregation levels for the wireless device specific search space is fixed to {6, 6, 2, 2} respectively, i.e. a total of 16 candidates in 1 ms subframe for the wireless device specific search space. The same principle is also defined for ePDCCH, 16 candidates. This leads to 32 blind decodes (in USS) considering that a wireless device 14 may need to monitor two different DCI sizes.

As agreed in RAN1 #87, dynamic switching between short and 1 ms TTI is supported. This means that a wireless device 14 has to search for both 1 ms TTI assignment/grant and sTTI assignment/grant in a subframe. Since the wireless device 14 may need to monitor additional candidates in the sPDCCH multiple times per subframe, the total number of blind decodes the wireless device 14 may need to perform may increase. The processing capability since Rel-8 timeframe has increased, so some additional blind decodes per carrier should be possible for the wireless device 14 to handle.

Observation 2 sTTI operation may require an increase in the number of blind decodes in the UE.

Proposal 2 Additional blind decodes might be defined for sTTI operation.

As a general principle, the same UE capabilities and thus the same number of required blind decodes for sTTI operation should be targeted for both FS1 and FS2. The solutions to limit the number of blind decodes may be slightly different for FS1 and FS2. But the requirements in terms of number of blind decodes per sTTI should be the same in FS1 and FS2 assuming the same sTTI length.

Proposal 3 Target the same overall number of blind decodes per sTTI for FS1 and FS2 assuming the same sTTI length In 2 OFDM symbol sTT, there are six sTTI within 1 ms subframe. If a maximum of six sPDCCH candidates is considered for each sTTI and assuming same DL/UL sDCI sizes, the wireless device 14 may need to monitor additionally 36 candidates within 1 ms subframe for sTTI operation. If the DL/UL sDCI sizes are different, then 72 additional candidates may need to be monitored. This, however, may require high processing capabilities for the wireless devices 14 to monitor all the PDCCH and sPDCCH candidates every 1 ms subframe. Therefore, sTT operation should aim at supporting up to six sPDCCH candidates per wireless device 14 for each 2-symbol sTTI. Since the wireless device 14 may only needs to monitor sPDCCH in two sTTIs per subframe, the number can be higher for slot-based TTI. Aiming at the same number of blind decodes for slot based sPDCCH as for 2os sPDCCH over a subframe, 18 candidates per slot TTI could be aimed for slot sPDCCH.

Proposal 4 sTTI operation supports up to 6 sPDCCH candidates per wireless device 14 for each 2-OFDM symbol sTTI Proposal 5 sTTI operation for 1-slot sTTI can support a larger number of candidates than 2-symbol sTTI A wireless device 14 can be configured to monitor at most two sPDCCH-RB-set(s), then for each sPDCCH-RB-set the number of sPDCCH candidates for each AL may be configured. The total number of sPDCCH candidates (including any AL), say A, cannot exceed the maximum number of blind decodes supported by a sTTI wireless device 14 in a given sTTI. Since sTTI will introduce additional blind decodes, to exploit efficiently the available number of blind decodes, the network node 12 may distribute the sPDCCH candidates over the AL as most suitable for a wireless device 14 considering channel and load situation. If $M^{(L)}$ is the number of sPDCCH candidates of AL L, sum($M^{(L)}$) over all AL L is equal to M. For some ALs, $M^{(L)}$ can be small to put more blind decoding effort on other ALs which are considered more appropriate to the channel and load conditions. Note that $M^{(L)}$ can be set to 0 for some AL but not for all ALs.

For instance, considering up to six sPDCCH candidates per wireless device 14 for each sTTI, the number of sPDCCH candidates could be defined as {3, 2, 1} for aggregation levels (1, 2, 4) to yield a total of 6 candidates per sTTI. For the example where aggregation level 1 is considered too aggressive for a wireless device 14, the number of sPDCCH candidates could be defined as {0, 4, 2} for aggregation levels {1, 2, 4}.

Proposal 6 For a RB-set, the number of sPDCCH candidates per aggregation level is configured over RRC As mentioned above, the number of sREG/sCCE is currently under discussion [3]. If a fixed number of sREG/sCCE is adopted by RAN1, it should be considered to make the number of monitored sPDCCH candidates per AL vary according to the sTTI index. In sTTI with large RS overhead, more sPDCCH candidates of high AL and fewer sPDCCH candidates of low AL are needed compared to sTTI with low RS overhead. Nevertheless, if sTTI index dependent number of sREG/sCCE is adopted, the same number of sPDCCH candidates per AL can be configured to be monitored for all sTTIs. Thus, the implementation may become simpler.

Observation 3 If a sTTI index dependent number of sREG/sCCE is adopted, the same number of sPDCCH candidates per aggregation level is configured to be monitored for all sTTIs.

Furthermore, since multiple sPDCCH candidates are considered within the same sPDCCH-PRB-set different wireless devices 14 may be able to share the same search space region. Hence, the network node 12 obtains enough flexibility for multiplexing the sDCI of several wireless devices 14.

Proposal 7 Multiplexing of sPDCCH for different wireless devices 14 within the same search space region is supported for sTTI operation.

Section 2.3: Limiting Blind Decodes on PDCCH

Since PDCCH can be used to transmit sDCI and dynamic switching between short and 1 ms TTI is supported, a wireless device 14 has to search for both 1 ms DCI and sDCI in PDCCH in every subframe. Consequently, the total number of blind decodes in PDCCH may increase. A way to limit the number of blind decodes may be to target a common format for short TTI and 1 ms TTI. Another way is to define a search space for sDCI sent on PDCCH as a subset set of the search space for 1 ms TTI DCI.

Observation 4 Having the same format for short TTI and 1 ms TTI in PDCCH USS may limit number of blind decodes in PDCCH.

Observation 5 The search space of sDCI in PDCCH can be a subset of the search space for 1 ms TTI DCI.

It is possible to set the higher layer parameter pdcch-candidateReductions to reduce the number of blind decodes for PDCCH USS for monitoring 1 ms DCI. This should however not be mandated. Preferably, the network node 12 may be able to distribute the total number of blind decodes supported by a sTTI wireless device 14 in a subframe over the different sTTI RB sets and PDCCH.

Section 2.4: Limiting Blind Decodes on sPDCCH

Uplink grants and downlink assignments in the DCI may in principle have slightly different fields, for instance dedicated bits for RVI and QCL are needed in DL while not in UL. While uplink grants and downlink allocations might have different amount of bits needed in the DCIs, these formats will be blindly decoded on the same sCCEs. As already mentioned in 2.1.2, in order to limit blind decodes, the design of DCI formats may aim for the same size for all grants and a bit field indicating if the DCI is an uplink grant or downlink assignment. This approach is similar to the flag for format 0/format 1A differentiation, as described in section 5.3.3.1.1 in [1]. Here padding bits can be used in addition to indicating bits, in case the number of required bits are different for uplink grants and downlink assignments. The single size approach may be most attractive if the DL and UL sizes are of similar size. This will be dependent on the supported TX schemes and the DCI sizes required by the different schemes.

Observation 6 A single size can be defined for both DL and UL sDCI, in order to limit the number of blind decodes for the wireless device 14

Section 2.5: sPDCCH Candidate to sCCE Mapping

A sPDCCH-PRB-set consists of a set of sCCEs, which are numbered from 0 to $N_{sCCE}-1$, where $N_{sCCE}$ is the number of sCCEs in the sPDCCH-PRB-set. Therefore, in order to define with full flexibility the set of sPDCCH candidates within the given sPDCCH-PRB-set for one wireless device 14 (or multiple wireless devices 14 sharing the same search space region) it is described that the sCCEs corresponding to a sPDCCH candidate are based on the EPDCCH definition described in Section 9 of TS 36.213.

Hence, the sCCEs corresponding to an sPDCCH candidate m within the UE-specific sTTI search space can be given by the following definition:

$$L\left\{\left(Y + \left\lfloor \frac{m \cdot N_{sCCE}}{L \cdot M^{(L)}} \right\rfloor + b\right) mod \lfloor N_{sCCE}/L \rfloor\right\} + i,$$

where Y refers to an wireless device specific offset that can be configured by the network over RRC or can be based on wireless device RNTI. It allows multiplexing of sPDCCH candidates as well as sharing the same search space region for different wireless devices 14. L is aggregation level and i=0, . . . , L−1. This means that higher aggregation levels consist of consecutives sCCEs. If a UE 14 is configured with a carrier indicator field, b is equal to the carrier indicator field value ($n_{CI}$), otherwise b=0. Respectively, the sPDCCH candidates are defined as m=0,1, . . . , $M^{(L)}-1$, where $M^{(L)}$ is the number of sPDCCH candidates to monitor for each configured aggregation level L within the sPDCCH-PRB-set.

As an example, FIG. 19 shows the sPDCCH candidates based in previous definition for two wireless devices 14 (UE0 and UE1) sharing the same sTTI search space region. This means that both wireless devices 14 are configured with the same sPDCCH-PRB-set, The sPDCCH-PRB-set consists of eight sCCE (numbered from 0 to 7) and the wireless devices 14 are configured with a total of six sPDCCH candidates to be monitored for each short TTI. The aggregation levels and number of sPDCCH candidates per AL configured by the network node 12 for both wireless devices 14 are the same: L={1, 2, 4} and $M^{(L)}$=(3, 2, 1). The UE 14 specific offset for UE0 is $Y_{UE0}$=0, and the wireless device 14 specific offset for UE1 is $Y_{UE0}$=1. As depicted, each wireless device 14 needs to monitor six sPDCCH candidates for each sTTI: {A, B, C} represent AL1 candidates, wherein A corresponds to candidate m=0, B to m=1 and C to m×2. Likewise, {D, E} represent AL2 candidates and {F} AL4 candidate.

In FIG. 19, it can be observed that defining the offset Y in a simple way it already provides a proper multiplexing of sPDCCH candidates for different wireless devices 14 sharing the same search space region.

Proposal 8 sCCEs corresponding to an sPDCCH candidate m within the UE-specific sTTI search space are given by $$L\left\{\left(Y + \left\lfloor \frac{m \cdot N_{sCCE}}{L \cdot M^{(L)}} \right\rfloor + b\right) mod \lfloor N_{sCCE}/L \rfloor\right\} + i,$$

where $N_{sCCE}$ is the number of sCCEs in the sPDCCH-PRB-set, Y refers to a wireless device 14 specific offset that can be configured by the network/network node 12 over RRC or can be based on UE RNTI. It allows multiplexing of sPDCCH candidates as well as sharing the same search space region for different wireless devices 14. L is aggregation level and i=0, . . . , L−1. This means that higher aggregation levels consist of consecutives sCCEs. If a wireless device 14 is configured with a carrier indicator field, b is equal to the carrier indicator field value ($n_{CI}$), otherwise b=0. Respectively, the sPDCCH candidates are defined as m=0,1, . . . , $M^{(L)}-1$, where $M^{(L)}$ is the number of sPDCCH candidates to monitor for each configured aggregation level L within the sPDCCH-PRB-set.

For EPDCCH and PDCCH the number of candidates per aggregation level, equivalent to $M^{(L)}$, is fixed in specification. RAN1 may decide to follow the same methodology for sPDCCH and define in the specification a fixed set of number of candidates per AL. As discussed above and especially in proposal 5, it is preferable to let the network node 12 distribute the available number of blind decodes over the different sPDCCH candidates. If such a fixed table for the number of candidates per AL is defined in the specification, it may be interpreted as a nominal number of candidates per AL. The network node 12 may have the flexibility to indicate over RRC which sPDCCH candidates are valid from a set given by the nominal number of sPDCCH candidates per aggregation level and an equation as in proposal 8. Consider, for instance, that the nominal number of sPDCCH candidates per aggregation level leads to a total of 8 sPDCCH candidates but that the maximum number of blind decodes supported by a wireless device 14 is 6, the network node 12 may have the flexibility to choose which 2 sPDCCH candidates from the nominal set are removed.

Observation 7 Additional RRC parameter may be needed to ensure the maximum supported number of blind decodes for a wireless device 14 is not exceeded Proposal 9 Consider a RRC parameter to indicate a reduction of candidates to monitor for a given sPDCCH-PRB-set More considerations regarding sPDCCH-PRB-set configurations are given in companion paper about design aspects of sPDCCH [3].

Section 3: Conclusion

In section 2 the following observations are made: Observation 1 A wireless device 14 can be further configured by higher layers to monitor only a subset of the aggregation levels supported for sTTI operation.

Observation 2 sTTI operation will require an increase in the number of blind decodes in the wireless device 14.

Observation 3 If a sTTI index dependent number of sREG/sCCE is adopted, the same number of sPDCCH candidates per aggregation level is configured to be monitored for all sTTIs Observation 4 Having the same format for short TTI and 1 ms TTI in PDCCH USS may limit number of blind decodes in PDCCH.

Observation 5 The search space of sDCI in PDCCH can be a subset of the search space for 1 ms TTI DCI.

Observation 6 A single size can be defined for both DL and UL sDCI, in order to limit the number of blind decodes for the wireless device 14.

Observation 7 Additional RRC parameter may be needed to ensure the maximum supported number of blind decodes for a wireless device 14 is not exceeded Based on the discussion in section 2 above, the following is proposed:

Proposal 1 Three aggregation levels {1, 2, 4} are supported for short TTI operation.

Proposal 2 Additional blind decodes might be defined for sTTI operation.

Proposal 3 Target the same overall number of blind decodes per sTTI for FS1 and FS2 assuming the same sTTI length.

Proposal 4 sTTI operation supports up to 6 sPDCCH candidates per wireless device 14 for each 2-OFDM symbol sTTI.

Proposal 5 sTTI operation for 1-slot sTTI can support a larger number of candidates than 2-symbol sTTI.

Proposal 6 For a RB-set, the number of sPDCCH candidates per aggregation level is configured over RRC.

Proposal 7 Multiplexing of sPDCCH for different wireless devices 14 within the same search space region is supported for sTTI operation.

Proposal 8 sCCEs corresponding to an sPDCCH candidate m within the UE-specific sTTI search space are given by $$L\left\{\left(Y + \left\lfloor\frac{m \cdot N_{sCCE}}{L \cdot M^{(L)}}\right\rfloor + b\right) mod \lfloor N_{sCCE}/L\rfloor\right\} + i,$$

where NsCCE is the number of sCCEs in the sPDCCH-PRB-set, Y refers to a wireless device 14 specific offset that can be configured by the network over RRC or can be based on wireless device 14 RNTI. It allows multiplexing of sPDCCH candidates as well as sharing the same search space region for different wireless devices 14. L is aggregation level and i=0, . . . , L−1. This means that higher aggregation levels consist of consecutives sCCEs. If a wireless device 14 is configured with a carrier indicator field, b is equal to the carrier indicator field value (nCI), otherwise b=0. Respectively, the sPDCCH candidates are defined as m=0,1, . . . , M(L)−1, where M(L) is the number of sPDCCH candidates to monitor for each configured aggregation level L within the sPDCCH-PRB-set.

Proposal 9 Consider a RRC parameter to indicate a reduction of candidates to monitor for a given sPDCCH-PRB-set.

Section 4: References

[1] R1-1611511, On sTTI scheduling options, 3GPP TSG-RAN WG1 #87, November 2016;
[2] R1-163312, System level evaluation of short TTI, Ericsson, 3GPP TSG RAN WG1 Meeting #84 bis, Ericsson Busan, 1-15 Apr. 2016;
[3] R1-1712895, Design aspects of sPDCCH, Ericsson, 3GPP TSG-RAN WG1 #90, August 2017.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, may be construed to constitute a complete written description of all combinations and subcombinations of the embodiments described herein, and of the manner and process of making and using them, and may support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for configuration of a downlink control channel for a short transmission time interval, sTTI, in a communication network, the network node comprising:
   processing circuitry configured to:
      assign a search space region to be monitored by a first wireless device in the communication network, the search space region including a plurality of downlink control channel candidates associated with a plurality of aggregation levels, each of the plurality of downlink control channel candidates having at least one corresponding short Control Channel Element, sCCE; and
      transmit, to the first wireless device, via Radio Resource Control, RRC, signaling a bitmap indicating at least one sCCE of at least one of the plurality of downlink control channel candidates for at least one aggregation level to monitor, the bitmap including a plurality of groups of bits, each group of bits corresponding to a respective one of the plurality of aggregation levels, each group of bits indicating sCCEs for an aggregation level to monitor.

2. The network node of claim 1, wherein the plurality of aggregation levels include at least aggregation levels 1, 2 and 4.

3. The network node of claim 1, wherein the bitmap indicates to monitor a subset of configured sCCEs for at least one of the plurality of aggregation levels.

4. The network node of claim 1, wherein each downlink control channel candidate is a short Physical Downlink Control Channel, sPDCCH, candidate.

5. The network node of claim 1, wherein the bitmap corresponds to a set of physical resource block, PRB, pairs to which the search space region is mapped, the set of PRB pairs enabling localized or distributed mapping of the search space region to the set of PRB pairs.

6. The network node of claim 1, wherein the plurality of sCCE are consecutive sCCEs.

7. The network node of claim 1, wherein the processing circuitry is further configured to:
assign another search space region to be monitored by a second wireless device in the communication network; and
transmit, to the second wireless device, another bitmap indicating at least one of the plurality of downlink control channel candidates for at least one aggregation level to monitor.

8. The network node of claim 7, wherein the at least one of the downlink control channel candidates for the second wireless device to monitor partially overlaps with the at least one of the downlink control channel candidates for the first wireless device to monitor.

9. The network node of claim 1, wherein the bitmap is a bitmap field.

10. A method for a network node for configuration of a downlink control channel for a short transmission time interval, sTTI, in a communication network, the method comprising:
assigning a search space region to be monitored by a first wireless device in the communication network, the search space region including a plurality of downlink control channel candidates associated with a plurality of aggregation levels, each of the plurality of downlink control channel candidates having at least one corresponding short Control Channel Element, sCCE; and
transmitting, to the first wireless device, via Radio Resource Control, RRC, signaling a bitmap indicating at least one of the plurality of downlink control channel candidates for at least one aggregation level to monitor, the bitmap including a plurality of groups of bits, each group of bits corresponding to a respective one of the plurality of aggregation levels, each group of bits indicating sCCEs for an aggregation level to monitor.

11. A wireless device for configuration of a downlink control channel for a short transmission time interval, sTTI, in a communication network, the wireless device comprising:
processing circuitry configured to:
receive via Radio Resource Control, RRC, signaling a bitmap corresponding to an assigned search space region to be monitored by the wireless device in the communication network, the search space region including a plurality of downlink control channel candidates associated with a plurality of aggregation levels, each of the plurality of downlink control channel candidates having at least one corresponding short Control Channel Element, sCCE; and
monitor the search space region based on the bitmap, the bitmap indicating at least one of a plurality of downlink control channel candidates for at least one aggregation level to monitor, the bitmap including a plurality of groups of bits, each group of bits corresponding to a respective one of the plurality of aggregation levels, each group of bits indicating sCCEs for the aggregation level to monitor.

12. The wireless device of claim 11, wherein the plurality of aggregation levels include at least aggregation levels 1, 2 and 4.

13. The wireless device of claim 11, wherein the bitmap indicates to monitor a subset of configured sCCEs for at least one of the plurality of aggregation levels.

14. The wireless device of claim 11, wherein each downlink control channel candidate is a short Physical Downlink Control Channel, sPDCCH, candidate.

15. The wireless device of claim 11, wherein the bitmap corresponds to a set of physical resource block, PRB, pairs to which the search space region is mapped, the set of PRB pairs enabling localized or distributed mapping of the search space region to the set of PRB pairs.

16. The wireless device of claim 11, wherein the plurality of sCCE are consecutive sCCEs.

17. The wireless device of claim 11, wherein the bitmap is a bitmap field.

18. A method for a wireless device for configuration of a downlink control channel for a short transmission time interval, sTTI, in a communication network, the method comprising:
receiving via Radio Resource Control, RRC, signaling a bitmap corresponding to an assigned search space region to be monitored by the wireless device in the communication network, the search space region including a plurality of downlink control channel candidates associated with a plurality of aggregation levels, each of the plurality of downlink control channel candidates having at least one corresponding short Control Channel Element, sCCE; and
monitoring the search space region based on the bitmap, the bitmap indicating at least one of a plurality of downlink control channel candidates for at least one aggregation level to monitor, the bitmap including a plurality of groups of bits, each group of bits corresponding to a respective one of the plurality of aggregation levels, each group of bits indicating sCCEs for the aggregation level to monitor.

* * * * *